US011294648B2

(12) United States Patent
Calvin

(10) Patent No.: US 11,294,648 B2
(45) Date of Patent: Apr. 5, 2022

(54) APPLICATION DEVELOPMENT ARCHITECTURE FOR MOBILE APPLICATIONS

(71) Applicant: salesforce.com, inc., San Francisco, CA (US)

(72) Inventor: Phil Calvin, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/946,879

(22) Filed: Jul. 9, 2020

(65) Prior Publication Data

US 2021/0365250 A1    Nov. 25, 2021

Related U.S. Application Data

(63) Continuation-in-part of application No. 15/929,812, filed on May 22, 2020.

(51) Int. Cl.

| | |
|---|---|
| *G06F 9/44* | (2018.01) |
| *G06F 8/38* | (2018.01) |
| *G06F 9/451* | (2018.01) |
| *G06Q 30/06* | (2012.01) |
| *H04M 1/72445* | (2021.01) |
| *H04M 1/72469* | (2021.01) |

(Continued)

(52) U.S. Cl.
CPC ............. *G06F 8/38* (2013.01); *G06F 8/34* (2013.01); *G06F 8/36* (2013.01); *G06F 9/451* (2018.02); *G06Q 30/0641* (2013.01); *H04M 1/72445* (2021.01); *H04M 1/72469* (2021.01); *H04W 12/069* (2021.01); *H04W 4/12* (2013.01)

(58) Field of Classification Search
CPC ......... H04W 12/069; H04W 4/12; G06F 8/36; G06F 8/38; G06F 8/34; G06F 9/451
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |

(Continued)

OTHER PUBLICATIONS

U.S. Appl. No. 16/861,410, filed Apr. 29, 2020, Phil Calvin.

(Continued)

*Primary Examiner* — Tuan A Vu
(74) *Attorney, Agent, or Firm* — Nicholson, De Vos, Webster & Elliott, LLP

(57) ABSTRACT

Methods and systems for developing mobile applications are disclosed. A method may include providing a user interface with one or more options for selecting features of a mobile application; obtaining the selected features of the mobile application, the selected features including at least one or more product display features and one or more product navigation features; generating metadata corresponding to the selected features of the mobile application, including at least metadata corresponding to the one or more product display features and metadata corresponding to the one or more product navigation features; generating code associated with the mobile application based on the metadata, the code executable by a processor of a mobile operating system (OS) based device; and associating the code with a unique mobile application global identifier relative to an app store.

20 Claims, 17 Drawing Sheets

(51) Int. Cl.
*G06F 8/34* (2018.01)
*G06F 8/36* (2018.01)
*H04W 12/069* (2021.01)
*H04W 4/12* (2009.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,797,724 B2 | 9/2010 | Calvin |
| 7,827,208 B2 | 11/2010 | Bosworth et al. |
| 7,853,881 B1 | 12/2010 | Aly Assal et al. |
| 7,870,294 B2 | 1/2011 | Braddy et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,572,559 B2 | 10/2013 | Calvin |
| 8,646,103 B2 | 2/2014 | Jakobson et al. |
| 8,762,938 B2 | 6/2014 | Calvin |
| 8,935,360 B2 | 1/2015 | Calvin et al. |
| 9,075,889 B2 | 7/2015 | Calvin et al. |
| 9,195,437 B2 | 11/2015 | Calvin |
| 9,223,892 B2 | 12/2015 | Calvin et al. |
| 9,276,995 B2 | 3/2016 | Calvin et al. |
| 9,448,773 B2 | 9/2016 | Calvin et al. |
| 9,525,720 B2 | 12/2016 | Calvin et al. |
| 9,572,614 B2 | 2/2017 | Calvin et al. |
| 9,635,090 B2 | 4/2017 | Calvin et al. |
| 9,811,506 B2 | 11/2017 | Calvin |
| 10,027,735 B2 | 7/2018 | Calvin et al. |
| 10,117,697 B2 | 11/2018 | Calvin et al. |
| 10,146,597 B2 | 12/2018 | Pack, III et al. |
| 10,212,209 B2 | 2/2019 | Calvin et al. |
| 10,489,486 B2 | 11/2019 | Calvin |
| 10,911,516 B2 | 2/2021 | Calvin et al. |
| 11,100,091 B2 | 8/2021 | Padmanabhan et al. |
| 11,157,484 B2 | 10/2021 | Padmanabhan et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |

(56) References Cited

U.S. PATENT DOCUMENTS

| | | |
|---|---|---|
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0248121 A1 | 11/2006 | Cacenco et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0075433 A1 | 3/2012 | Tatzgern et al. |
| 2012/0084638 A1 | 4/2012 | Calvin et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0290406 A1 | 10/2013 | Calvin et al. |
| 2013/0305218 A1* | 11/2013 | Hirsch ............... G06F 8/36 717/106 |
| 2014/0122649 A1 | 5/2014 | Calvin et al. |
| 2014/0122993 A1 | 5/2014 | Calvin et al. |
| 2014/0304692 A1 | 10/2014 | Calvin et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0127781 A1 | 5/2015 | Calvin et al. |
| 2015/0142596 A1 | 5/2015 | Jakobson et al. |
| 2015/0172563 A1 | 6/2015 | Jakobson et al. |
| 2016/0021166 A1 | 1/2016 | Calvin et al. |
| 2016/0048481 A1 | 2/2016 | Calvin |
| 2016/0088058 A1 | 3/2016 | Calvin et al. |
| 2016/0164947 A1 | 6/2016 | Calvin et al. |
| 2016/0371312 A1 | 12/2016 | Ben-Aharon et al. |
| 2017/0048301 A1 | 2/2017 | Calvin et al. |
| 2017/0252085 A1 | 9/2017 | Calvin et al. |
| 2017/0305218 A1 | 10/2017 | Stanifer et al. |
| 2017/0359702 A1* | 12/2017 | Peterson ............ H04W 4/12 |
| 2017/0371521 A1* | 12/2017 | Multani ............ H04W 12/069 |
| 2019/0258396 A1 | 8/2019 | Barrick |
| 2019/0377806 A1 | 12/2019 | Padmanabhan et al. |
| 2019/0379721 A1 | 12/2019 | Calvin et al. |
| 2020/0089670 A1 | 3/2020 | Padmanabhan et al. |
| 2021/0342037 A1 | 11/2021 | Calvin |

OTHER PUBLICATIONS

U.S. Appl. No. 15/929,812, filed May 22, 2020, Phil Calvin.

"Google Plus Users", Google+Ripples, Oct. 31, 2011 [retrieved on Feb. 21, 2012 from Internet at http://www.googleplusers.com/google-ripples.html], 3 pages.

Final Office Action, U.S. Appl. No. 15/929,812, dated Oct. 15, 2021, 12 pages.

IEEE, "Part 11: Wireless LAN Medium Access Control (MAC) and Physical Layer (PHY) Specifications", ANSI/IEEE Std 802.11, 1999 Edition, IEEE Computer Society, 1999, 528 pages.

Non-Final Office Action, U.S. Appl. No. 15/929,812, dated Apr. 27, 2021, 12 pages.

* cited by examiner

APPLICATION DEVELOPMENT ARCHITECTURE FOR MOBILE APPLICATIONS

CROSS REFERENCE TO RELATED APPLICATIONS

This application is a Continuation-in-Part (CIP) of commonly assigned U.S. patent application Ser. No. 15/929,812, titled "POLYMORPHIC APPLICATION ARCHITECTURE," by Phillip Norman Calvin, filed on May 22, 2020. This application is related to commonly assigned U.S. patent application Ser. No. 16/861,410, titled "PALETTE MANAGEMENT USER INTERFACE", by Phillip Norman Calvin, filed Apr. 29, 2020, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing and more specifically relates to application development.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art.

Application development may include developing mobile applications and web applications. Each application may be uniquely developed and customized for a particular business. Users of an application may expect a smooth experience as when the application is developed by a team of experience developers. This may be possible when the application is associated with a business with a big budget. However, it may be challenging for small and medium sized businesses with smaller budget that cannot afford such customization. One possible solution for small and medium sized businesses is to use applications developed based on templates. Using the templates to develop applications may be less expensive but the applications may be less flexible in terms of quality, usability, performance and utility. Using the templates to develop applications may also cause an issue with distribution to an app store when the application is a mobile app. This is because the app store (e.g., App Store maintained by Apple Inc. of Cupertino, Calif.) may view these applications as clones of one another, and therefore may not allow more than one app to be included in the app store.

BRIEF DESCRIPTION OF THE DRAWINGS

The included drawings are for illustrative purposes and serve only to provide examples of possible structures and process operations for the disclosed techniques. These drawings in no way limit any changes in form and detail that may be made to implementations by one skilled in the art without departing from the spirit and scope of the disclosure.

DETAILED DESCRIPTION

Figure 1:
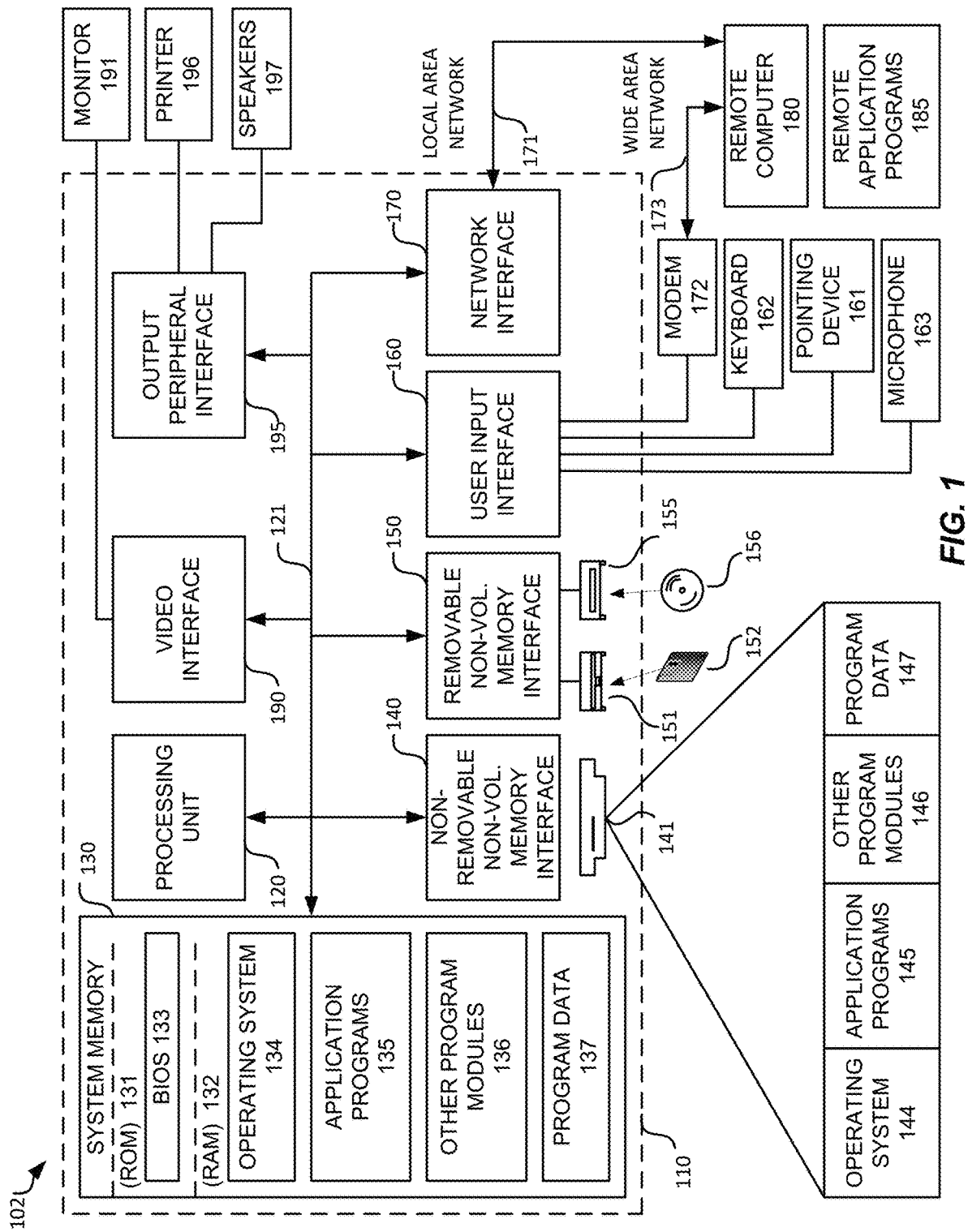
FIG. 1 shows a diagram of an example computing system that may be used with some implementations.

Examples of systems and methods for generating mobile applications using an application development architecture will be described with reference to some implementations. These examples are being provided solely to add context and aid in the understanding of the present disclosure. It will thus be apparent to one skilled in the art that the techniques described herein may be practiced without some or all of these specific details. In other instances, well known process operations have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, some implementations. Although these implementations are described in sufficient detail to enable one skilled in the art to practice the disclosure, it is understood that these examples are not limiting, such that other implementations may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed implementations may include a computer-implemented method to develop a mobile application and may comprise providing a user interface with one or more options for selecting features of a mobile application; obtaining the selected features of the mobile application, the selected features including at least one or more product display features and one or more product navigation features; generating metadata corresponding to the selected features of the mobile application, including at least metadata corresponding to the one or more product display features and metadata corresponding to the one or more product navigation features; generating code associated with the mobile application based on the metadata, the code executable by a processor of a mobile operating system (OS) based device; and associating the code with a unique mobile application global identifier relative to an app store.

The disclosed implementations may include a system for developing a mobile application and may include a processor, and a non-transitory computer readable medium storing a plurality of instructions, which when executed, cause the processor to provide a user interface with one or more options for selecting features of a mobile application; obtain the selected features of the mobile application, the selected features including at least one or more product display features and one or more product navigation features; generate metadata corresponding to the selected features of the mobile application, including at least metadata corresponding to the one or more product display features and metadata corresponding to the one or more product navigation features; generate code associated with the mobile application based on the metadata, the code executable by a processor of a mobile OS based device; and associate the code with a unique mobile application global identifier relative to an app store.

The disclosed implementations may include a computer program product for developing mobile applications comprising computer-readable program code to be executed by a processor of a mobile-OS-based device when retrieved from a non-transitory computer-readable medium, the program code including instructions configurable to cause providing a user interface with one or more options for selecting features of a mobile application; obtaining the selected features of the mobile application, the selected features including at least one or more product display features and one or more product navigation features; generating metadata corresponding to the selected features of the mobile application, including at least metadata corresponding to the one or more product display features and metadata corresponding to the one or more product navigation features; generating code associated with the mobile application based on the metadata, the code executable by a processor of a mobile OS based device; and associating the code with a unique mobile application global identifier relative to an app store.

While one or more implementations and techniques are described with reference to developing a mobile application implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the claimed subject matter. Further, some implementations may include using Hardware Security Module (HSM), a physical computing device that safeguards and manages digital keys for strong authentication, including, for example, the keys used to encrypt secrets associated with the data elements stored in the data stores. It may be noted that the term "data store" may refer to source control systems, file storage, virtual file systems, non-relational databases (such as NoSQL), etc. For example, the migrated data may be stored in a source control system and then exposed through a virtual file system.

Any of the above implementations may be used alone or together with one another in any combination. The one or more implementations encompassed within this specification may also include examples that are only partially mentioned or alluded to or are not mentioned or alluded to at all in this brief summary or in the abstract. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

FIG. 1 is a diagram of an example computing system that may be used with some implementations. In diagram 102, computing system 110 may be used by a user to establish a connection with a server computing system. The computing system 110 is only one example of a suitable computing system, such as a mobile computing system, and is not intended to suggest any limitation as to the scope of use or functionality of the design. Neither should the computing system 110 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 110 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some implementations may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some implementations may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 110 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 110 typically includes a variety of computer program product. Computer program product can be any available media that can be accessed by computing system 110 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 110. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 110, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 110 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 110 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 110 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 110. The logical connections depicted in FIG. 1 include a local area network (LAN) 171 and a wide area network (WAN) 173 but may also include other networks. Such networking environments are commonplace in offices, enterprise-wide computer networks, intranets and the Internet.

FIG. 1 includes a local area network (LAN) 171 and a wide area network (WAN) 173 but may also include other networks. Such networking environments are commonplace in offices, enterprise-wide computer networks, intranets and the Internet.

When used in a LAN networking environment, the computing system 110 may be connected to the LAN 171 through a network interface or adapter 170. When used in a WAN networking environment, the computing system 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 110, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some implementations may be carried out on a computing system such as that described with respect to FIG. 1. However, some implementations may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
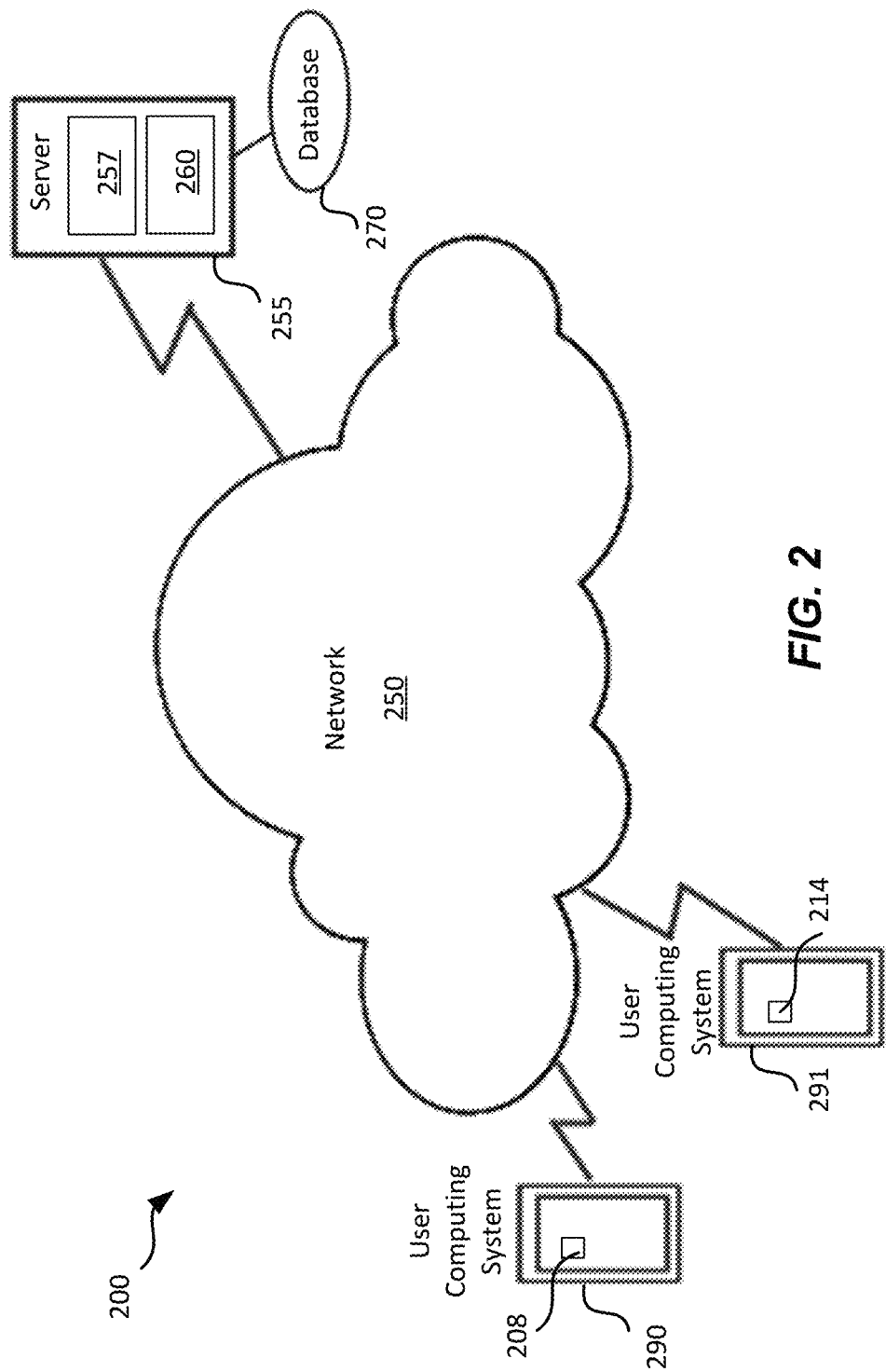
FIG. 2 shows a diagram of an example network environment that may be used with some implementations.

FIG. 2 shows a diagram of an example network environment that may be used with some implementations. Diagram 200 includes computing systems 290 and 291. One or more of the computing systems 290 and 291 may be a mobile computing system. The computing systems 290 and 291 may be connected to the network 250 via a cellular connection or via a Wi-Fi router (not shown). The network 250 may be the Internet. The computing systems 290 and 291 may be coupled with server computing systems 255 via the network 250. The server computing system 255 may be coupled with database 270.

Each of the computing systems 290 and 291 may include an application module such as module 208 or 214. For example, a user may use the computing system 290 and the application module 208 to connect to and communicate with the server computing system 255 and log into application 257. The user may need to be authenticated. For some implementations, the server computing system 255 may host application builder 260 configured to generate mobile applications. The application builder 260 may be configured to retrieve information from and to store information in the database 270. For example, the database 270 may be configured to store product information or service information for a business associated with a mobile application generated using the application builder 260. As another example, the database 270 may be configured to store metadata associated with a mobile application generated using the application builder 260. For some implementations, the application builder 260 may be associated with a mobile version configured to execute in a mobile computing system such as a smart phone to generate the mobile applications. The mobile version of the application builder 260 may be configured to access information stored in the database 270.

Figure 3A:
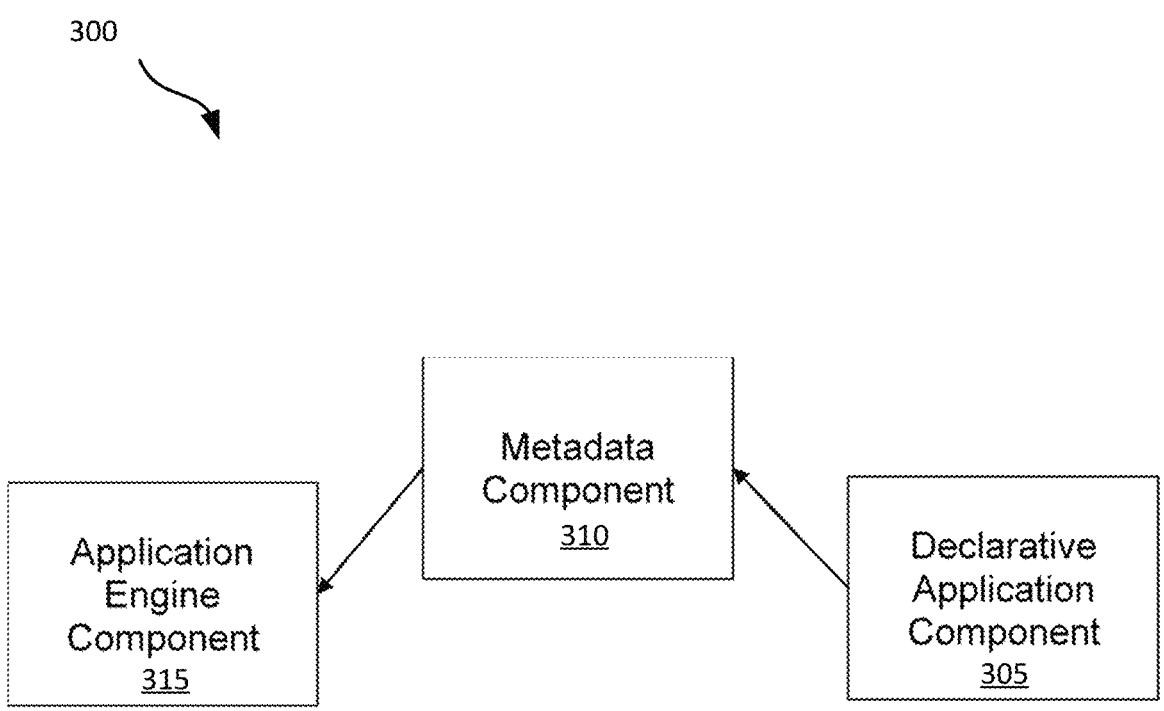
FIG. 3A shows an example application development architecture that may be used to develop mobile application, in accordance with some implementations.

FIG. 3A shows an example application development architecture that may be used to develop mobile applications, in accordance with some implementations. Diagram 300 includes three main components of an application development architecture, with the metadata component 310 serving as a connective component between the declarative application component 305 and the application engine component 315. The declarative application component 305 may be configured to enable selecting features of a mobile app using a visual interface such as a declarative user interface. Each feature may be associated with a set of metadata. The metadata component 310 may be configured to combine the metadata associated with the selected features. The application engine component 315 may be configured to consume the metadata provided by the metadata component 310 to generate mobile applications that can run on mobile devices.

Figure 3B:
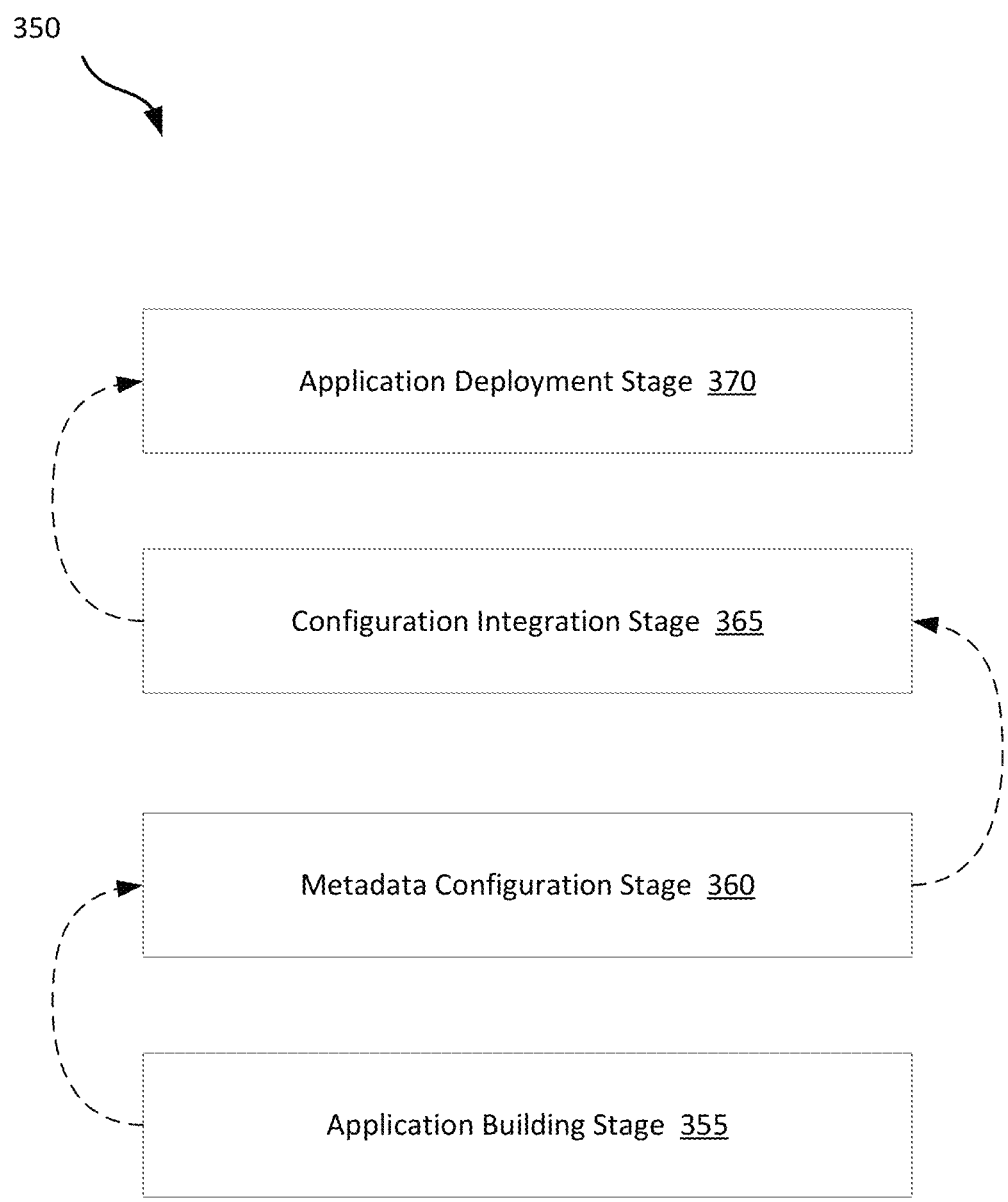
FIG. 3B shows an example development life cycle that may be used to generate mobile applications, in accordance with some implementations.

The declarative application component 305 may correspond to the application building stage 355 (shown in FIG. 3B). The declarative application component 305 may be associated with an application builder 260 and a declarative user interface 440 (shown in FIG. 4A). The metadata component 310 may correspond to the metadata configuration stage 360 (shown in FIG. 3B). The metadata component 310 may be associated with the metadata engine 505 (shown in FIG. 5A). The application engine component 315 may correspond to the configuration integration stage 365 and the application deployment stage 370 (shown in FIG. 3B). The application engine component 315 may be associated with the container data structure (shown in FIG. 6A).

The application engine component 315 may be configured to include modules to perform operations related to how a product is presented in the mobile application using a particular layout such as, for example, a compact layout, a detailed layout, etc., how a set of products is presented in the mobile application, how to navigate the mobile application to find products, how to configure a product (e.g., price, shipping, etc.), how to select the fields and options for each product, and how to select the color, branding, icons, fonts for the store that the mobile application is used for.

For some implementations, each mobile application developed using the architecture of FIG. 3A may be associated with a global configuration. For example, there may be an object named Store.Config which may be retrieved from a server computing system using a server call. The global configuration may be used as an initial configuration for a mobile application, and customization may be added to the initial configuration to generate a customized configuration for a specific mobile application. For some implementations, the customization of the configuration of a mobile application may be implemented using a global configuration stored in a mobile device and not have to be retrieved from a server computing system. For example, the global configuration may be stored in a property list (or plist) file where plist is a file extension for files that are configured to store configuration information in an iOS environment.

For some implementations, the navigation operations associated with the application engine component 315 may include global navigation operations and product or service navigation operations for a mobile application. The global navigation operations may be based on global navigation patterns and may be configured to enable users to navigate the mobile application. In the iOS environment, for example, the global navigation patterns may be standard navigation patterns such as stage left (or hamburger) and tab bar. Other variants of the global navigation patterns may be used.

The product or service navigation operations may be configured to enable users of a mobile application to navigate a set of available products and services in the mobile application. This may be dependent on the set of available product items. For some implementations, the global navigation pattern and the product/service navigation pattern may be configured by the declarative application component 305 and used by the application engine component 315 as configuration of the mobile application.

For some implementations, the product display operations of the application engine component 315 may be configured to use a product layout to create a view for a particular instance of a product. A view of an instance of a product may vary depending on whether the display includes text, image or video. A layout may be a horizontal layout or a vertical layout.

FIG. 3B shows an example development life cycle that may be used to generate mobile applications, in accordance with some implementations. Typically, a development life cycle may include a series of tasks. For example, the tasks may be divided into stages which may include requirement collection stage, application design stage, software development stage, integration and testing stage, and deployment stage. Having a development life cycle may be useful because it provides consistency to develop applications, and it keeps track of tasks to be performed to ensure that the development effort results in quality applications. The development life cycle described above may be more fitting for a team of experienced software developers developing commercial applications rather than for a normal user or a small business proprietor who may not have any programming background.

Diagram 350 includes a development life cycle that may enable a small business proprietor or someone with minimal or no prior programming background to generate quality mobile applications. The development life cycle of diagram 350 may include application building stage 355, metadata configuration stage 360, configuration integration stage 365 and application deployment stage 370.

For some implementations, during the application building stage 355, a user may use the application builder 260 (shown in FIG. 2) to start generating a mobile application. The application builder 260 may be configured to enable a user to interactively select features or characteristics of a mobile application to be generated. For some implementation, the application builder 260 may be configured to include a declarative user interface to enable a user to select options from a menu to configure a mobile application. The user may also select options by clicking on buttons displayed via the declarative user interface. Different types of software-enabled buttons may be implemented. As will be described, the declarative user interface is an interface that may enable a user to interact with to visually generate various features of a mobile application. For example, a user may select a horizontal layout that can be used to display a product horizontally.

For some implementations, during the metadata configuration stage 360, metadata may be generated based on options (also referred to as declaratives) selected via the declarative user interface. For example, when a horizontal layout is selected, metadata associated with the horizontal layout may be determined. As another example, when a color scheme is selected, metadata associated with the color scheme may be determined. For some implementations, the metadata configuration stage 360 may include operation of a metadata engine 505 (shown in FIG. 5A) configured to combine the metadata determined based on the options selected via the declarative user interface. The metadata combined by the metadata engine 505 may be used to generate a mobile application.

For some implementations, during the configuration integration stage 365, the metadata combined by the metadata engine 505 during the metadata configuration stage 360 may be customized to generate a unique mobile application for a particular business or store. For some implementations, a globally unique application identifier may be generated to ensure that the mobile applications when published is considered a unique application from an identification perspective. The customized unique mobile application generated by the configuration integration stage 365 may enable the application to be deployed or distributed to an app store during the application deployment stage 370 as a unique app. This may prevent the mobile application from being rejected by the app store as a clone app of another app generated using the same development life cycle.

Figure 4A:
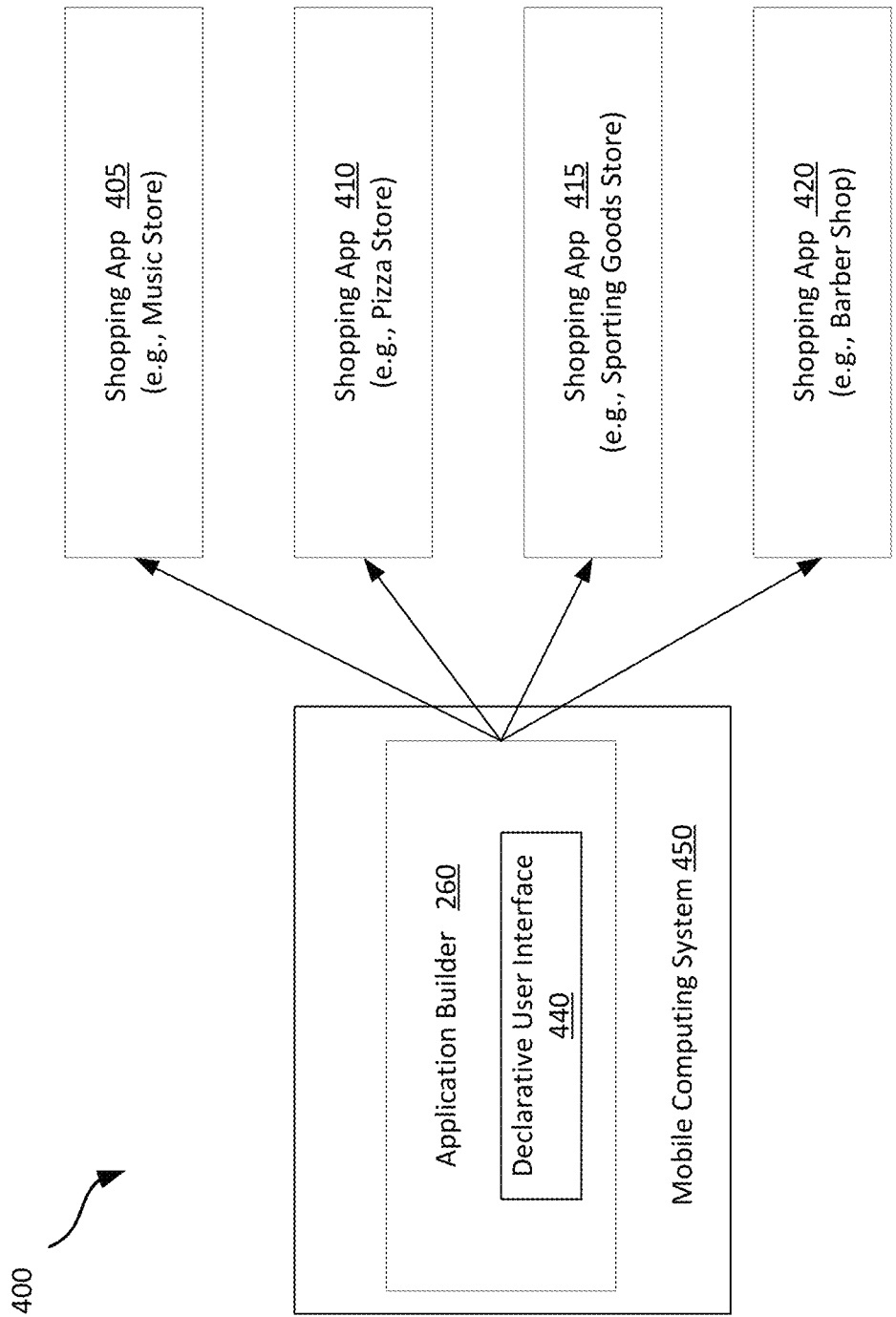
FIG. 4A shows an example application builder, in accordance with some implementations.

FIG. 4A shows an example application builder, in accordance with some implementations. Diagram 400 includes the application builder 260 which may be configured to enable generating multiple mobile applications 405, 410, 414 and 420. For some implementations, the application builder 260 may be a mobile application configured to execute on a mobile computing system such as a smart phone. For example, the application builder 260 may be an application that executes in an Android or an iOS environment, and it may be distributed via an app store such as, for example, Google Play App Store or Apple App Store. A user may search for the application builder 260 from the app store, download and install the application builder 260 onto mobile computing system 450, and run the application builder 260 from the mobile computing system 450 to generate a mobile application for a business. The application builder 260 may include a declarative user interface 440 to enable visually configuring a mobile application.

For some implementations, the mobile applications (also referred to as shopping apps) may be configured to operate with small and medium businesses or stores that sell products and/or services. A user may use the application builder 260 to generate a consumer grade shopping app and to enable a business to have a presence in an app store with minimal time investment and without the typical high cost of associated with mobile app development. For example, the shopping app 405 may be associated with a music store, the shopping app 410 may be associated with a pizza store, the shopping app 415 may be associated with a sporting goods store, and the shopping app 420 may be associated with a barber shop.

Figure 4B:
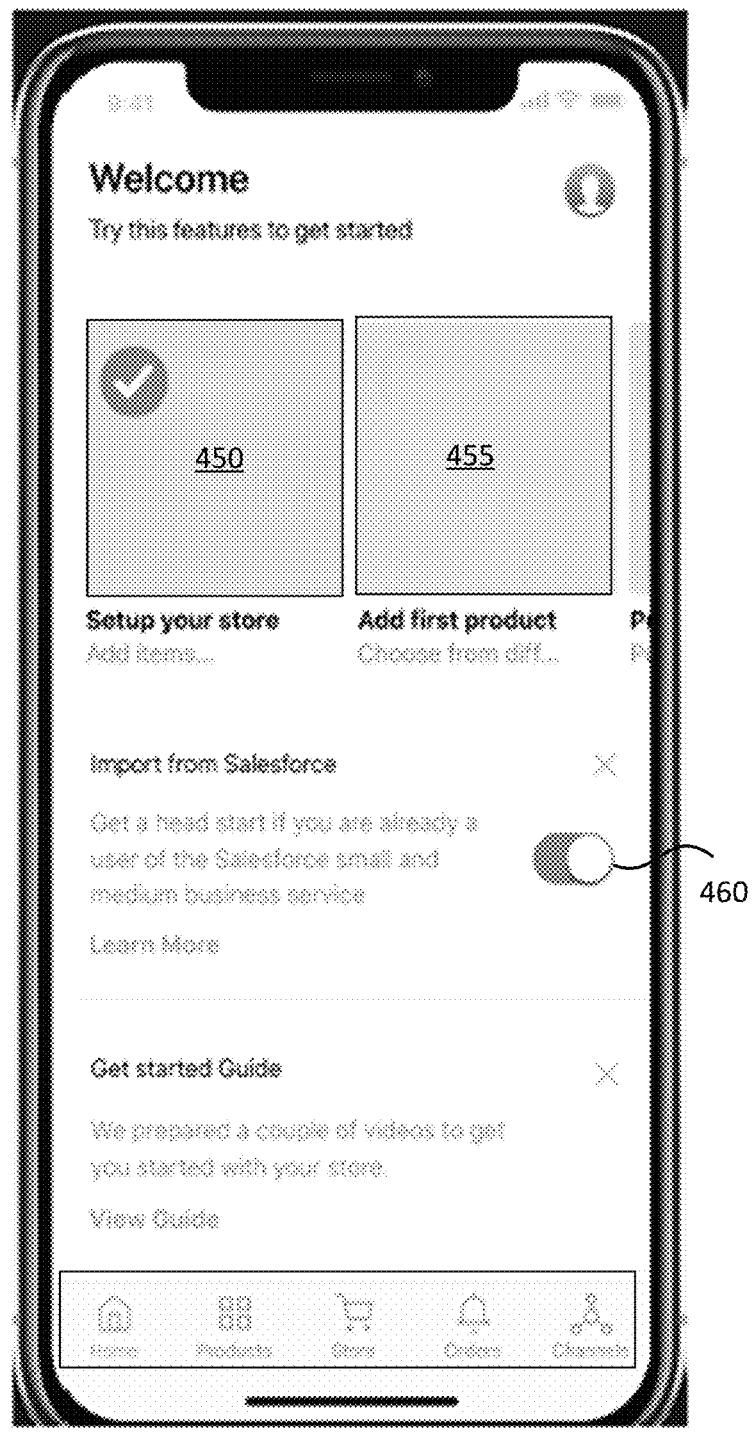
FIG. 4B is an example screen shot of a home page of a mobile app associated with a declarative user interface, in accordance with some implementations.

FIG. 4B is an example screen shot of a home page of a mobile app associated with a declarative user interface, in accordance with some implementations. The declarative user interface 440 may be a visual interface that can be used to compose a shopping app. The declarative user interface 440 may include a set of screens that have options that allow non-technical users to configure a shopping app, including determining the layouts used, the primary color for the palette, etc. The declarative user interface 440 may also include menus and visual menu options to configure a shopping app. For example, a user may select visual option 450 to set up a shopping app for a business and visual option 455 to add a product to the shopping app. Visual options 450 and 455 are examples of declaratives in a declarative user interface. For some implementations, when an option is selected, metadata corresponding to the selected option may be determined from a set of pre-built metadata.

The declarative user interface 440 may enable a user to select options (or declaratives) and configure the shopping app in real time. A preview option may be available to preview the shopping app as the shopping app is being configured. A save option may be available to save the selected options and to generate a shopping app based on the metadata associated with the selected options. For some implementations, data import option 460 may be available to enable importing existing data stored in a server environment into the shopping app. In this example, the business may already be a subscriber to services offered by Salesforce.com of San Francisco, Calif. For example, product data may be stored in a database associated with Salesforce-.com.

Figure 5A:
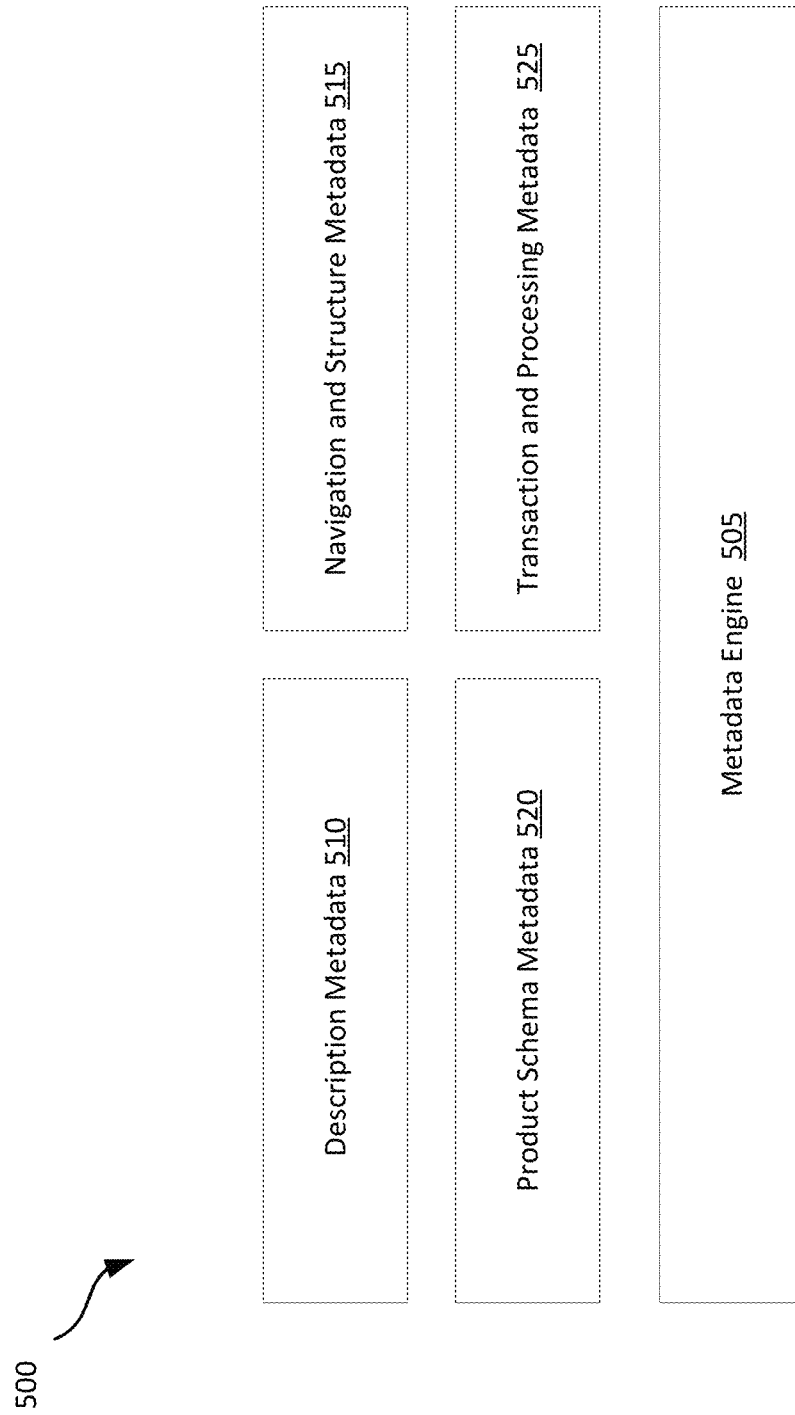
FIG. 5A shows an example diagram of metadata categories associated with a metadata engine, in accordance with some implementations.

FIG. 5A shows an example diagram of metadata categories associated with a metadata engine, in accordance with some implementations. Diagram 500 includes the metadata engine 505 which may be configured to operate on the metadata generated based on selection of options in the declarative user interface. For some implementations, the metadata may be categorized as description metadata 410, navigation and structure metadata 415, product schema metadata 420, and transaction and processing metadata 425. The operation of the metadata engine 505 may be associated with the metadata configuration stage 310 (shown in FIG. 3).

For some implementations, the description metadata 410 may include metadata associated with a name of a business, a description of the business, a business icon, a color scheme and a font scheme. In general, the description metadata 410 may be used for branding and theming of a shopping app. The color scheme and font scheme are described in FIG. 5B.

For some implementations, the navigation and structure metadata 415 may include metadata associated with global navigation and metadata associated with product and service navigation. The global navigation may be related to how a user navigate around the shopping app. The product and service navigation may be related to how a user navigate a particular product or a service. The navigation may include selecting options using a menu or tab bar and transitioning among pages and products or services. The extent of the navigation around a set of available products and services in a shopping app may be a function of a set of available product items. For some implementations, there may be navigation patterns available for businesses with small, medium and large number of product items. Features such as search and categorization may be included or excluded depending on how the shopping app is implemented. Configuration of the global navigation and product and services navigation may be performed using the application builder 260. In general, the navigation and structure metadata 415 may be used to enable a user to navigate around a shopping app based on how the shopping app is structured.

For some implementations, the product schema metadata 420 may include metadata associated with products and/or services offered by a business. This may include, for example, the format of how the product data is organized including, for example, field names associated with the product data. This may also include information about where the product data is stored. For example, the product data may be stored in database 270 (shown in FIG. 2). In general, the product schema metadata 420 connects the shopping app to one or more of the products and services offered by a business or store associated with a shopping app.

For some implementations, the transaction and processing metadata 425 may include metadata associated with operations to perform when a user selects a product or a service. This may include, for example, operations related to a purchase transaction and a payment transaction by a customer of a business associated with a shopping app. In general, the transaction and processing metadata 425 may enable purchases of one or more of the products and services associated with a shopping app to be completed. Following is an example metadata that includes metadata associated with a horizontal layout and metadata associated with a vertical layout:

```
{
    "name": "product_compact",
    "items": [
        {
            "type": "HorizontalLayoutItem",
            "item": {
                "items": [
                    {
                        "type": "MediaLayoutItem",
                        "item": {
                            "size": "medium",
                            "field": "media",
                            "filter": "first",
                            "margin": {
                                "right": "xsmall"
                            }
                        }
                    },
                    {
                        "type": "VerticalLayoutItem",
                        "item": {
                            "items": [
                                {
                                    "type": "TextLayoutItem",
                                    "item": {
                                        "textStyle": "headline",
                                        "multiline": false,
                                        "field": "name"
                                    }
                                },
                                {
                                    "type": "TextLayoutItem",
                                    "item": {
                                        "textStyle": "body",
                                        "multiline": true,
                                        "field": "description",
                                        "margin": {
                                            "top": "xsmall"
                                        }
                                    }
                                }
                            ],
                            "alignment": "top"
                        }
                    }
                ],
                "alignment": "left",
                "margin": {
                    "around": "xsmall"
                }
            }
        }
```

```
        }
      ]
}
```

Figure 5B:
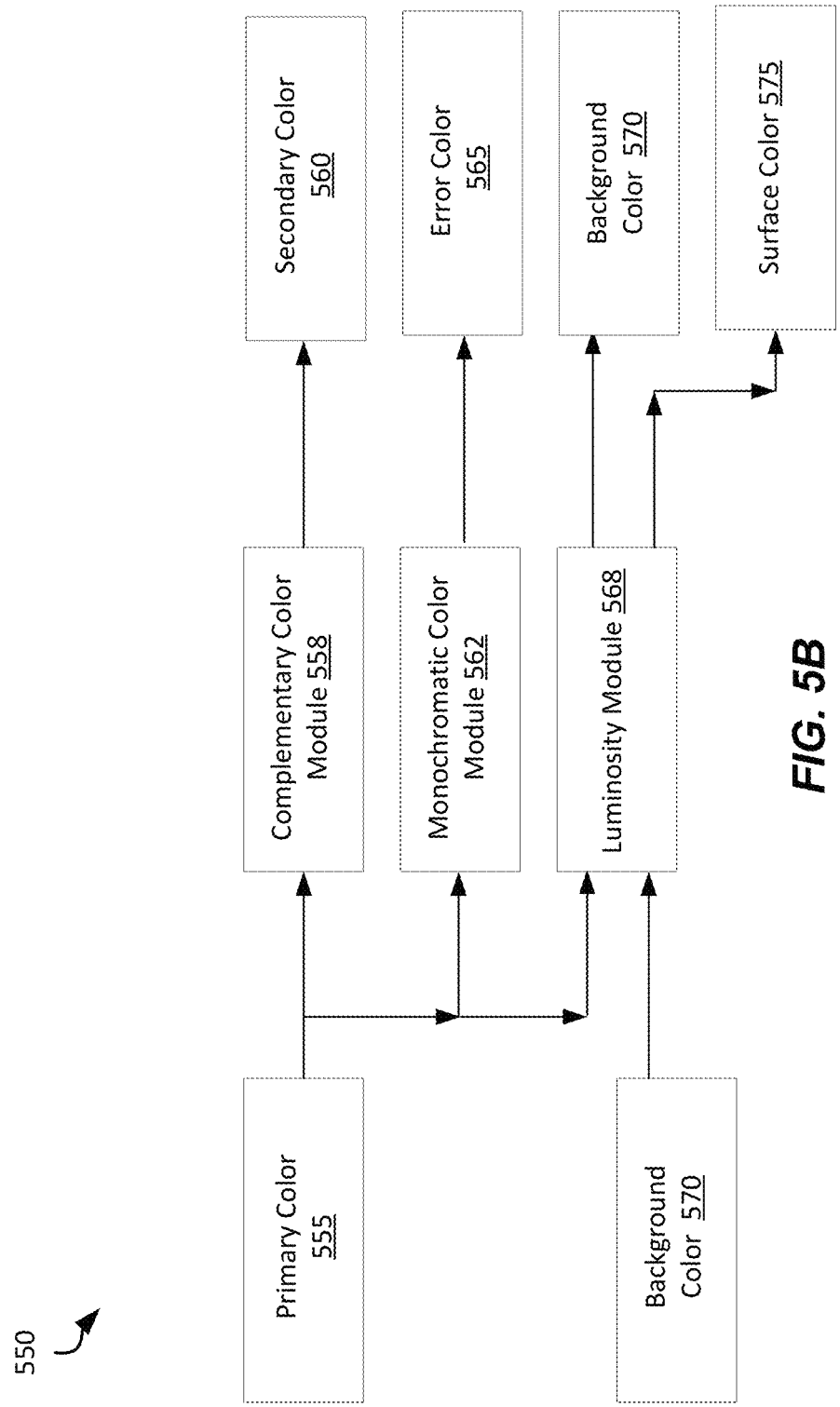
FIG. 5B shows an example relationship of colors used in a color scheme for a shopping app, in accordance with some implementations.

FIG. 5B shows an example relationship of colors used in a color scheme for a shopping app, in accordance with some implementations. A color scheme and font scheme in the description metadata 410 may be based on a primary color selected by a user. The primary color may be a color that is used as a main theme of the shopping app, and it may be a color that is used most often. For some implementations, a primary color may be specified by selecting a color scheme option or declarative from the declarative user interface. For example, the primary color may be selected based on a brand color associated with a business. For some implementations, the color scheme may include at least a primary color, a secondary color, an error color, a background color and a surface color. The secondary color 560 may be a complementary color of the primary color 555 (as determined by the complementary color module 558). The error color 565 may be a monochromatic color of the primary color 555 (as determined by the monochromatic color module 562). The background color 570 may be either black or white depending on luminosity of the primary color 555 (as determined by the luminosity module 568) based on a threshold value. For example, when the luminosity of the primary color is more than 35%, the background color 570 is white; otherwise, the background 570 color is black. The surface color 575 may be determined from the background color 570 by determining the luminosity of the background color 570 (as determined by the luminosity module 568). When the luminosity of the background color 575 violates a threshold value, the surface color 575 may be the background color 570 with an increase in brightness adjusted based on a delta value. When the luminosity of the background color 570 does not violate the second threshold value, the surface color 575 may be the background color 570 with a decrease in brightness adjusted based on the delta value. The surface color 575 may be viewed as an accent color of the background color. Accent may be determined as brighter or darker from the background color 570 by taking the background color 570 and adjusting the brightness of the background color 570 by the delta value to get the accent color. The primary color 555, the secondary color 560, the error color 565, the background color 570, and the surface color 575 may be associated with different frames of a shopping app. A detailed description of techniques to generate a color scheme and font scheme is discussed in commonly assigned U.S. patent application Ser. No. 16/861,410, titled "PALETTE MANAGEMENT USER INTERFACE", by Phillip Norman Calvin, filed Apr. 29, 2020, which is hereby incorporated by reference in its entirety and for all purposes.

Figure 6A:
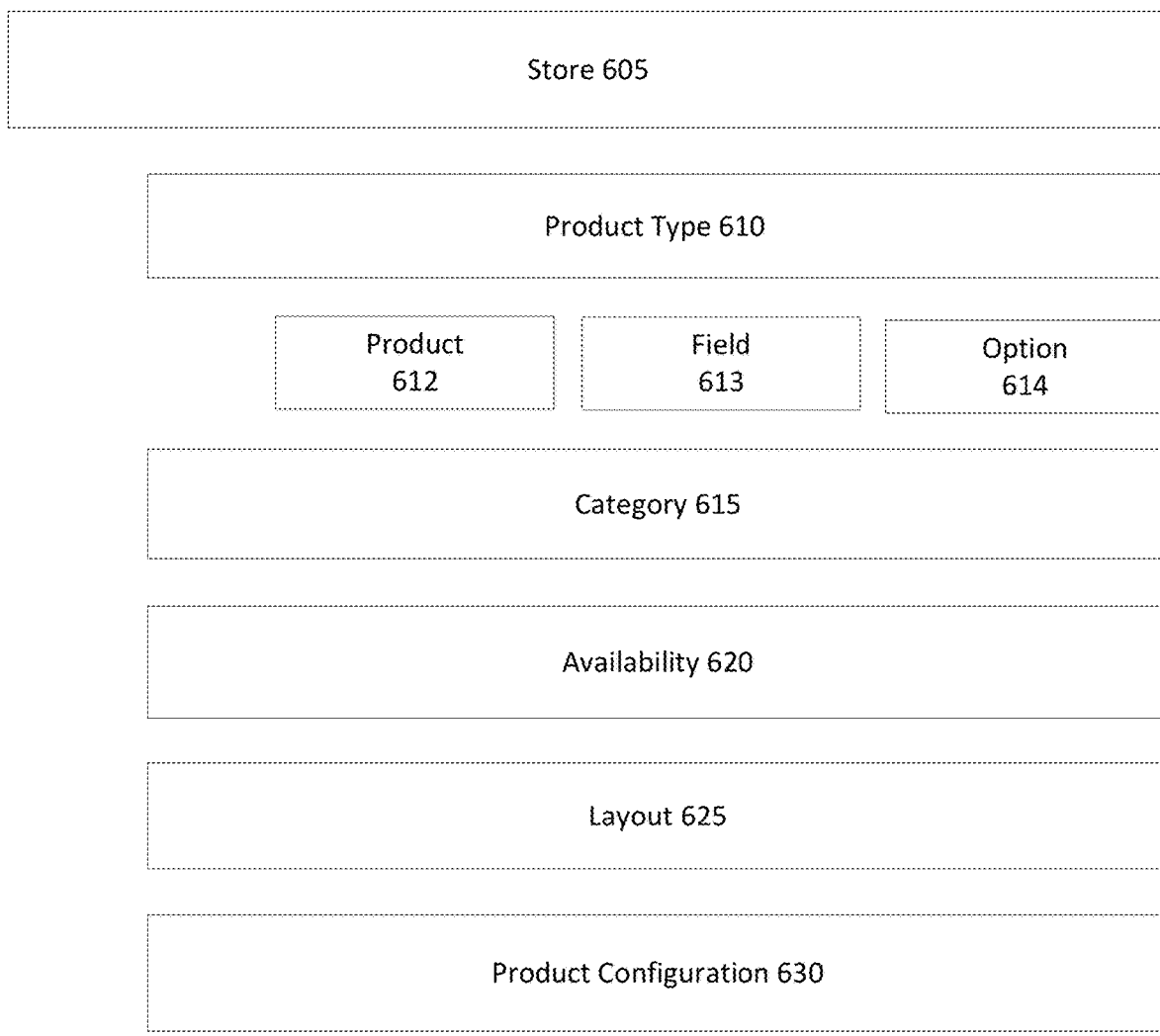
FIG. 6A shows an example data structure associated with a shopping app, in accordance with some implementations.

FIG. 6A shows an example data structure associated with a shopping app, in accordance with some implementations. Diagram 600 includes a container data structure configured to include multiple objects. In this example, the store 605 may be a container. All the products and product types are contained within a container. An instance of the store 605 (also referred to as store container) may include product type object 610. The product type object 610 may be associated with category object 615, availability object 620, layout object 625 and product configuration object 630. An instance of the store container may be associated with a particular business and a corresponding shopping app.

For some implementations, the product type object 610 may be associated with the following structure:
- a unique product type ID
- a human readable product type name such as, for example, as Pizza, Shirt, Haircut, etc.
- a set of fields that define the product such as, for example, product name, images, etc.
- a set of options that are available to configure a product such as, for example, size, color, frame, material, etc.

For example, the product type object 610 may include product parameter 612, field parameter 613 and option parameter 614. Other parameters may also be possible. The product parameter 612 may be related to an instance of a particular product and may include product type name and product type ID. The field parameter 613 may be related to information about a product of a product type. For example, the field parameter 613 may include text such as product name, list, image, video, etc. about a particular product. For some implementations, a field parameter 613 may be configured visually. The option parameter 614 may be related to configurable appearances for a product type. This may include configuring size, color, style, list of items, etc. for a product type. For some implementations, the option parameter 614 may be configured visually using an editor associated with the declarative user interface 440.

For some implementations, the category object 615 may be associated with an organizational unit for a group of products. For example, for a music store business, the products may be categorized under heavy metals, classic 50s and classic 80s. For some implementations, the availability object 520 may be associated with availability information for a particular product or service instance as related to inventory.

For some implementations, the layout object 525 may be associated with visual organization of the fields and options to display on a particular product instance of a particular product type. The visualizations in the field and options may be rendered in the layout. The layout may also include simple positional layout items such as a horizontal layout item and a vertical layout item. There may be a product list layout to enable viewing a list of products, and there may be a product lay out to enable viewing a single product. The product layout may include a compact layout and a detailed layout. For some implementations, the different layouts may be associated with metadata, and there may be pre-built metadata for each type of layout.

For some implementations, the product configuration object 530 may be related to a particular configuration of a product with a particular set of option values. The options may be related to size, color and texture. This may allow configuring how a product is viewed. For example, an image of a product can be displayed as small, medium or large, and a layout of a product can be a compact layout or a detailed layout. For some implementations, the size and layout information may be selected based on visual representation instead of based on numeric representation or specific numbering.

A product configuration may involve combining a particular detailed layout with a rendering of each of the individual options that are available for the particular product type. Following is a code example that may be used to define product types:

```
{
  productTypes: [
```

-continued

```
{
    id: "
    name: 'Cleaning Service'
    fields: [.... list of fields ....]
    options: [.... list of options ....]
    layouts: [.... list of layouts ....]
    availability: [{always}]
},
{
    id: "
    name: 'Pizza Shop'
    fields: [.... list of fields ....]
    options: [.... list of options ....]
    layouts: [.... list of layouts ....]
    availability: [{always}]
},
{
    id: "
    name: 'Music Store'
    fields: [.... list of fields ....]
    options: [.... list of options ....]
    layouts: [.... list of layouts ....]
    availability: [{always}]
},
{
    id: "
    name: 'Beauty Store'
    availability: [Monday-Friday, 10 am to 8 pm]
},
]
}
```

Using the container data structure of diagram 600, an example product-based business such as a music store may be associated with a container instance having the following values:

Music Store (a container)—this container has several objects
  Album (a product type object)—describes an album and has several parameters
    Field Parameter
      Text Field—Album title
      Image Field—Album artwork
      List Field—Songs
    Option Parameter
      Media Type—A list of the medium to deliver the album on, e.g., 8-Track, Cassette, Album, CD, MP3
    Layout Parameter
      A compact layout—showing just the album artwork
      Detailed Layout—showing title, artwork, and listing of all songs
  Concert Artwork (a product type object)—describes posters, pictures and has several parameters
    Field Parameter
      Text Field—The title
      Image Field—The picture
    Option Parameter
      Size—Size of picture when purchased
      Material—List of material to print picture on
      Frame—List of frame options
    Layout Parameter
      A compact layout—showing the picture with an image above it
  Concert Shirt (a product type object)—describes concert t-shirt and has several parameters
    Field Parameter
      Text Field—Name of concert t-shirt
      Image Field—Picture of the t-shirt
      List Field—List of shirt pictures: front, back, side, focus on sleeves
    Option Parameter
      Size: Available sizes for t-shirt
    Layout Parameter
      A compact layout—showing just the t-shirt
      Detailed Layout—showing the t-shirt and a name with a carousel allowing a user to swipe through the images
  Music Categories (a category object)—describes different types of music
    Heavy Metal
    Classic 50s
    Classic 80s Using the container data structure of diagram 600, an example service-based business such as a beauty store may be associated with a container instance having the following hierarchy of values:

Beauty store (a container)—this container has several objects
  Haircut (a product type object)—describes genders for haircut
    Option Parameter
      Male
      Female
      Children
  Hair Coloring (a product type object)—describes coloring types
    Option Parameter
      Temporary
      Semi-Permanent
      Permanent Initially, when a shopping app is generated, some sample values may be used to populate an instance of a store container associated with the shopping app. The sample values may be updated with actual values. For example, to populate an instance of the store container 605, a user may add a product by selecting a product type from a list of available product types. The user may then be presented with possible fields in the product type with which to fill in the details. A category option may be presented to enable the user to enter categories when applicable. It may be possible that some small businesses may not be associated with many categories and may not fully utilize the complete hierarchy of the store container 605. For some implementations, when existing product data is available, a user may choose to import the existing data, as described with FIG. 4B.

Figure 6C:
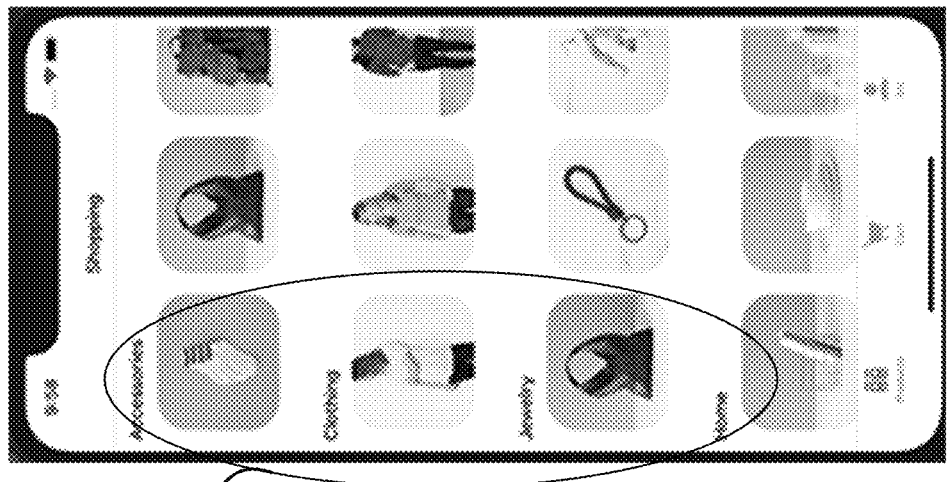
FIGS. 6B, 6C, 6D, 6E, 6F, 6G show example screen shots that include configurable options for a shopping app, in accordance with some implementations.
Figure 6B:
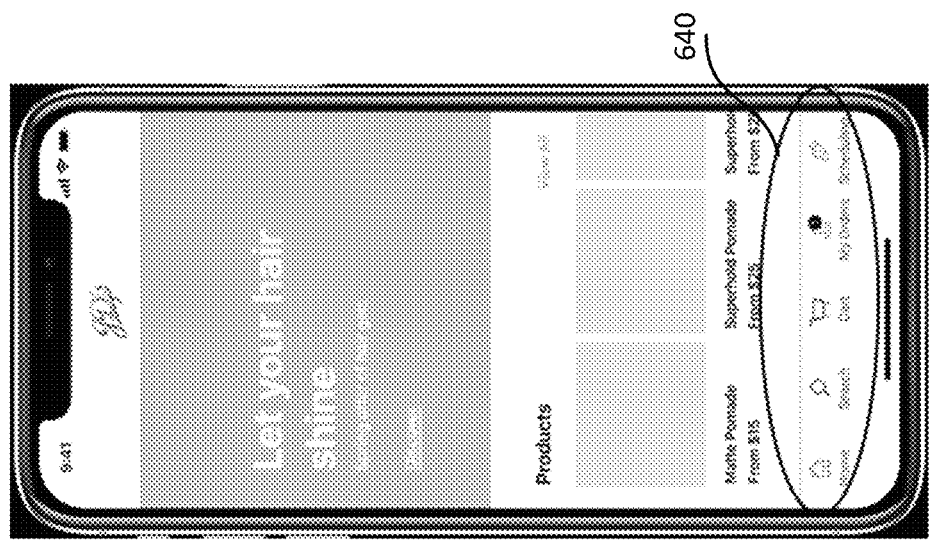

FIG. 6B is an example screen shot of a shopping app showing the global navigation, in accordance with some implementations. In this example, the global navigation 640 may include options to navigate to a home page, a search page, a shopping cart page, an order page and a scheduling page. Depending on the type of business that the shopping app is generated for, the options included in the global navigation may vary. For some implementations, the home page of the shopping app may consist of a series of cards. A card is a technique to design a user interface (also referred to as card user interface). A card may hold information such as text, image, buttons, etc. designed together to achieve certain user experience. A card may be swiped vertically or horizontally to display a different card. The cards may include varying content and may be statically positioned in the shopping app or dynamically pushed from a server computing system to the shopping app. For some implementations, the home page of the application builder 260 may also be implemented using a card user interface. The global navigation shown in FIG. 6B may be configured by the navigation and structure metadata 515 (shown in FIG. 5A).

FIG. 6C is an example screen shot of a shopping app showing the product navigation, in accordance with some implementations. In this example, the products are grouped in categories 645 (e.g., accessories, clothing, etc.). A user may select a product in those categories. Each of the products in each category is shown displayed in a compact layout. In a compact layout, only an image of a product may be displayed. In this example, the list of products may be displayed using a horizontal layout where the images of the products are shown horizontally. FIG. 6D is an example screen shot of a shopping app showing the service navigation, in accordance with some implementations. In this example, each of the services is displayed with a detailed layout having text and images. In this example, the list of services may be displayed using a vertical layout. For some implementations, the display of a product or a service may be implemented by taking a product or a service and a particular layout and create a view for that product or service. This may be accomplished by evaluating the information available for a product (e.g., text, image, video) and a layout (e.g., horizontal or vertical) that the product is to be render with. The product and service navigation shown in FIG. 6C and FIG. 6D may be configured by the navigation and structure metadata 515 (shown in FIG. 5A).

Figure 6E:
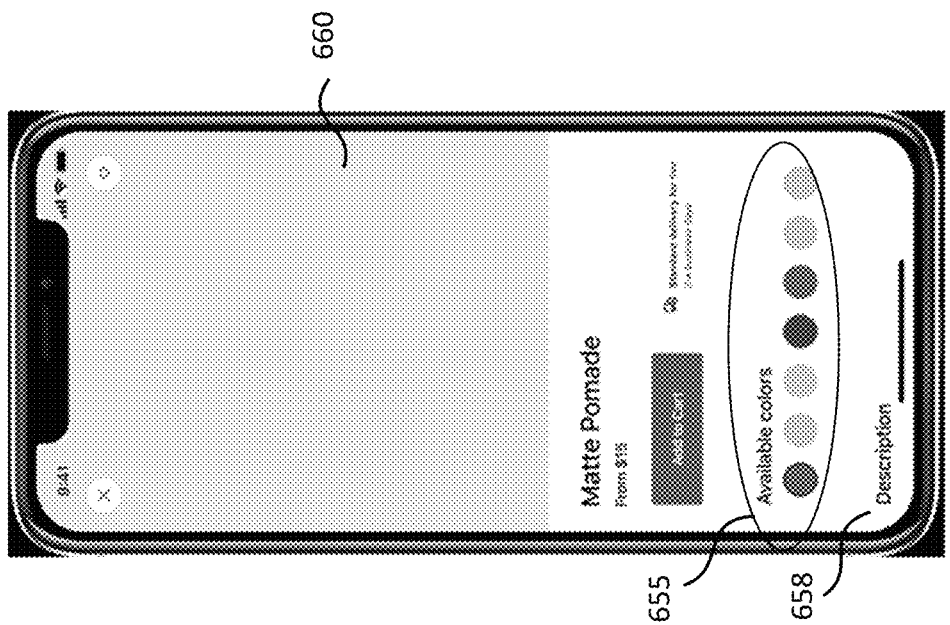
Figure 6D:
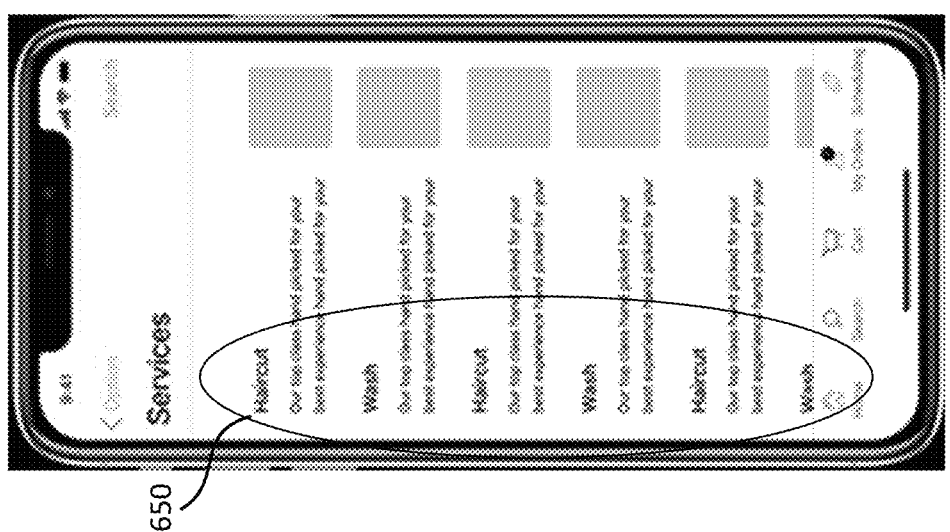

FIG. 6E is an example screen shot of a shopping app showing the product configuration options, in accordance with some implementations. In this example, the product configuration option involves different color options 655 that may be selected to render as a background display color 660 of a product using a particular layout. Description 658 may be provided to provide more detail information about the product. The product configuration shown in FIG. 6E may be configured by the description metadata 510 (shown in FIG. 5A).

Figure 6G:
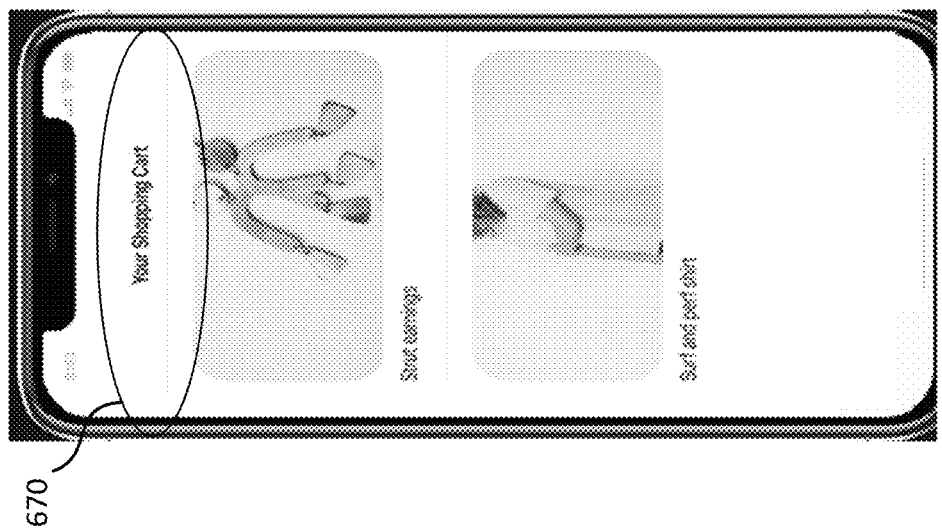
Figure 6F:
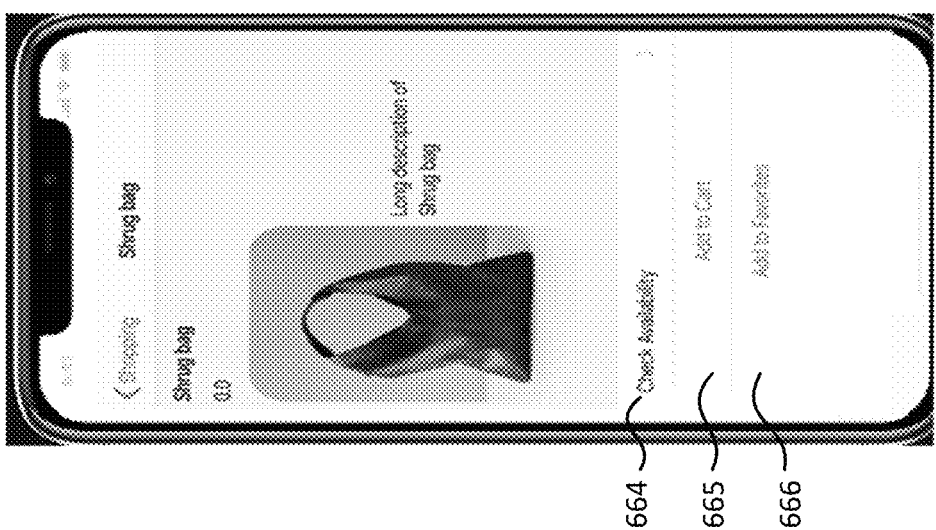

FIG. 6F is an example screen shot of a shopping app showing a detailed view of a product and add-to-cart option, in accordance with some implementations. The screen shot of FIG. 6F may be displayed as a result of navigating from a selection of a product displayed in a category as shown in the example screen shot of FIG. 6C. An add-to-cart option 665 may be added to the detailed view of a product. Other options may also be added including, for example, the check-product-availability option 664 and add-to-favorite option 666. FIG. 6G is an example screen shot of a shopping cart content, in accordance with some implementations. The shopping cart content option 670 may be added to enable viewing products that have been added to a shopping cart. The products in the shopping cart may be displayed using either a compact layout or a detailed layout. The shopping cart options shown in FIG. 6F and FIG. 6G may be configured by the transaction and processing metadata 525 (shown in FIG. 5A).

Figure 7A:
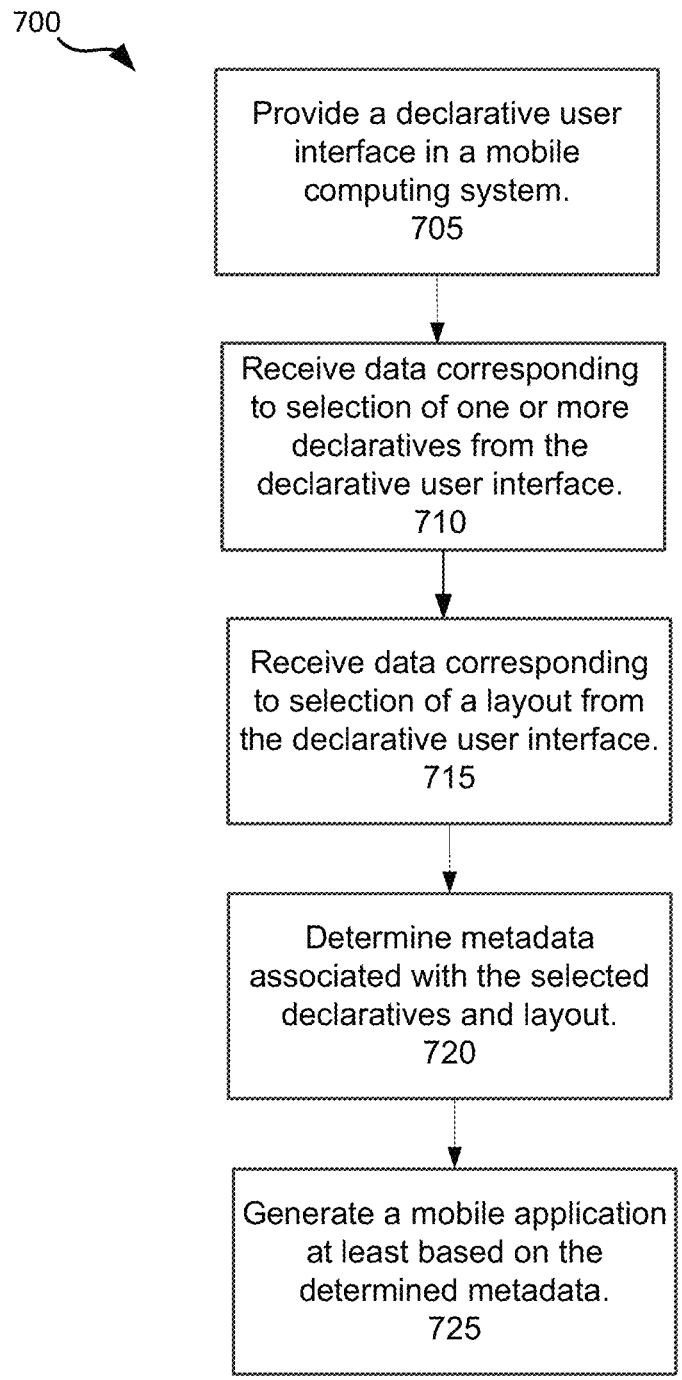
FIG. 7A is an example flow diagram of a process that may be used to generate a shopping app using a declarative user interface, in accordance with some implementations.

FIG. 7A is an example flow diagram of a process that may be used to generate a shopping app using an application builder, in accordance with some implementations. The process 700 may be performed using an application builder such as application builder 260 (shown in FIG. 4A) and a declarative user interface such as the declarative user interface 440 (shown in FIG. 4A). At block 705, a declarative user interface may be provided to enable selecting one or more declaratives to configure a mobile application. The one or more declaratives may be used to visually configure characteristics of the mobile application. The declarative user interface may be provided by a mobile computing system. At block 710, data corresponding to selection of one or more declaratives for the mobile application may be received. At block 715, data corresponding to selection of a layout to associate the one or more selected declaratives with the mobile application may be received. At block 720, metadata associated with the one or more selected declaratives may be determined. The metadata may be determined from a set of pre-built metadata. At block 725, a mobile application may be generated based on the metadata associated with the one or more selected declaratives and the layout.

Figure 7B:
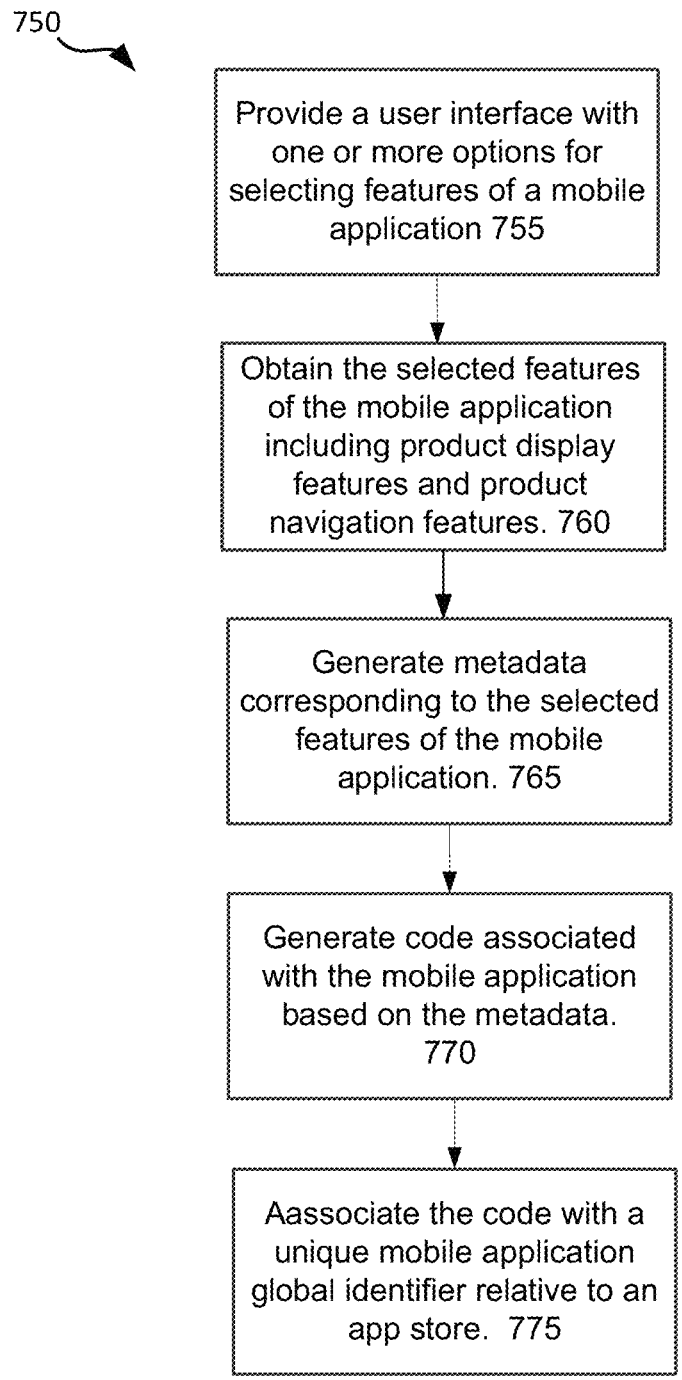
FIG. 7B is an example flow diagram of a process that may be used to generate a shopping app using an application development architecture, in accordance with some implementations.

FIG. 7B is an example flow diagram of a process that may be used to generate a shopping app using an application development architecture, in accordance with some implementations. The process 750 may be associated with operations related to the components shown in FIG. 3A. At block 755, a user interface may be provided. The user interface may include one or more options for selecting features of a mobile application. At block 760, the selected features of the mobile application may be obtained. The selected features may include at least one or more product display features and one or more product navigation features. At block 765, metadata corresponding to the selected features of the mobile application may be generated. The metadata may include at least metadata corresponding to the one or more product display features and metadata corresponding to the one or more product navigation features. At block 770, program code associated with the mobile application may be generated based on the metadata. The program code may be executable by a processor of a mobile OS based device. At block 775, a global identifier relative to an app store may be assigned to the program code to enable the program code to be distributed to the app store.

Figure 8A:
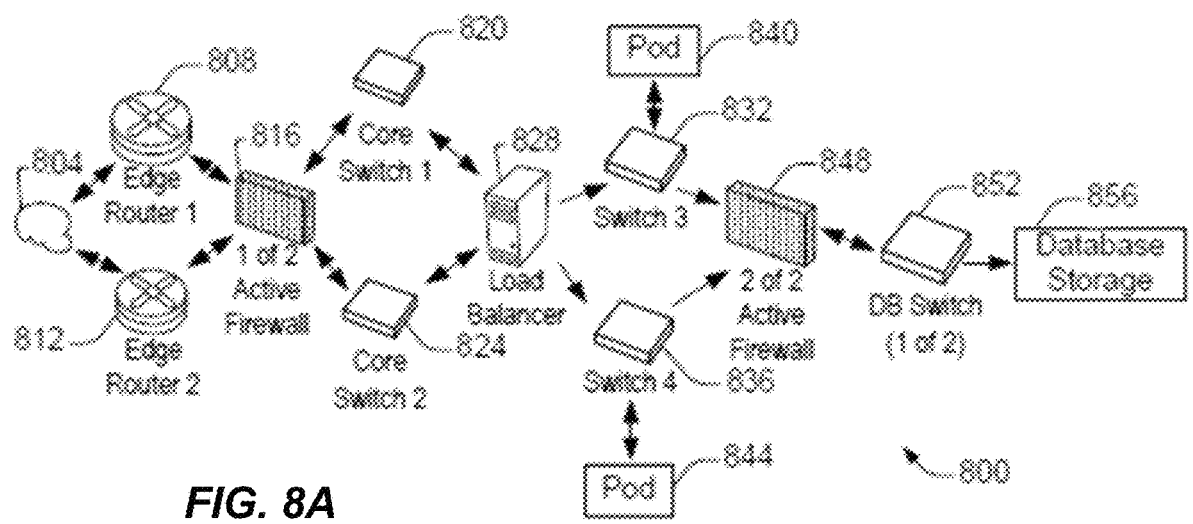
FIG. 8A shows a system diagram illustrating architectural components of an applicable environment, in accordance with some implementations.

FIG. 8A shows a system diagram 800 illustrating architectural components of an on-demand service environment, in accordance with some implementations. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand Services. Communication with the pods may be conducted via pod switches 832 and 836. Components of the on-demand service environment may communicate with a database storage system 856 via a database firewall 848 and a database switch 852.

Figure 8B:
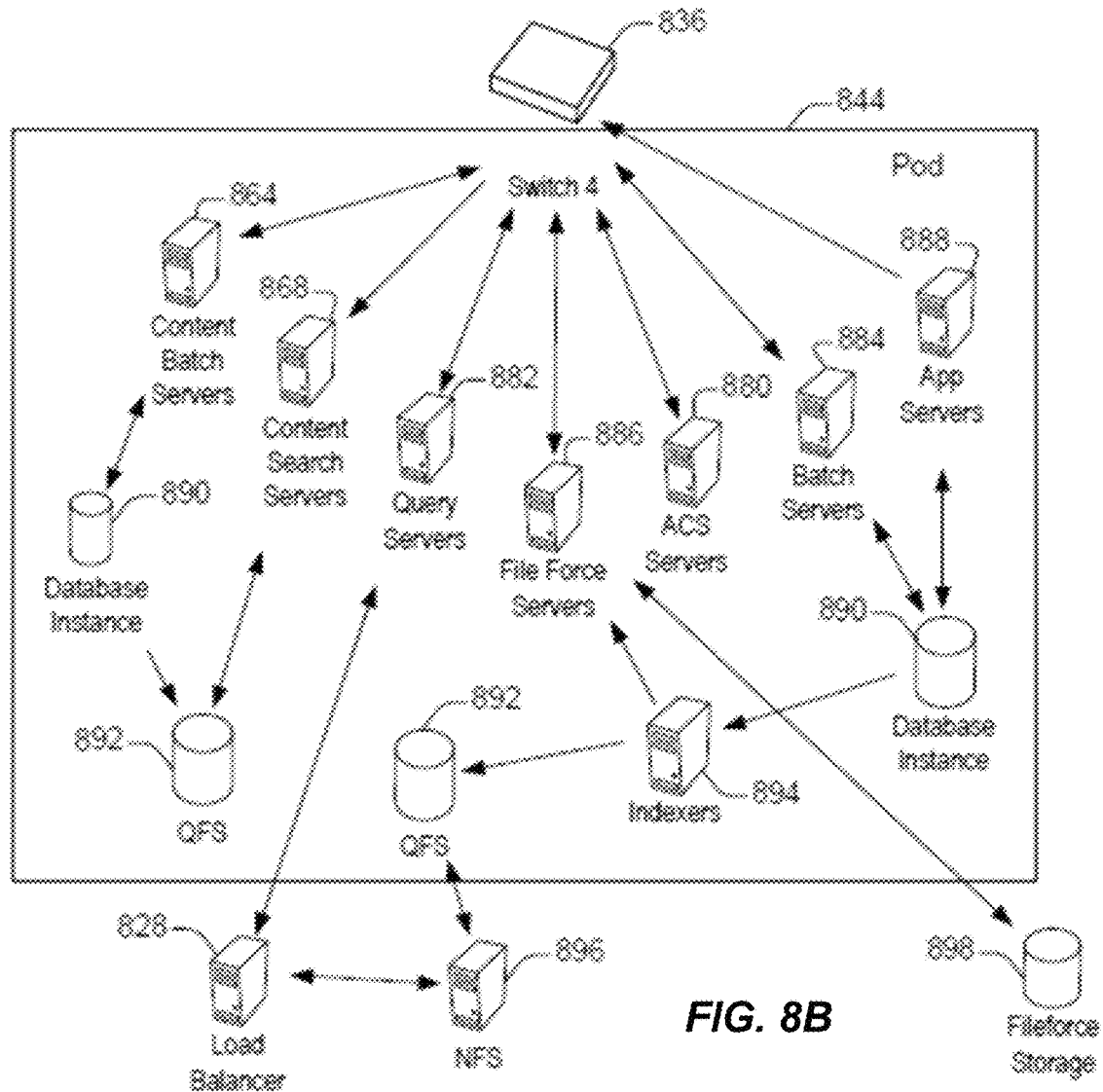
FIG. 8B shows a system diagram further illustrating architectural components of an applicable environment, in accordance with some implementations.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some implementations of an on-demand service environment may include anywhere from one to many devices of each type. Also, the on-demand service environment need not include each device shown in FIGS. 8A and 8B or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some implementations, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more implementations, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some implementations, the core switches 820 and 824 are high-capacity switches that transfer packets within the on-demand service environment 800. The core switches 820 and 824 may be configured as network bridges that quickly route data between different components within the on-demand service environment. In some implementations, the use of two or more core switches 820 and 824 may provide redundancy and/or reduced latency.

In some implementations, the pods 840 and 844 may perform the core data processing and service functions provided by the on-demand service environment. Each pod may include various types of hardware and/or software computing resources. An example of the pod architecture is discussed in greater detail with reference to FIG. 8B.

In some implementations, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some implementations, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some implementations, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some implementations, the database storage system 856 is an on-demand database system shared by many different organizations.

The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one implementation. The pod 844 may be used to render services to a user of the on-demand service environment 800. In some implementations, each pod may include a variety of servers and/or other systems. The pod 844 includes one or more content batch servers 864, content search servers 868, query servers 882, Fileforce servers 886, access control system (ACS) servers 880, batch servers 884, and app servers 888. Also, the pod 844 includes database instances 890, quick file systems (QFS) 892, and indexers 894. In one or more implementations, some or all communication between the servers in the pod 844 may be transmitted via the switch 836.

In some implementations, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may request internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 886 may manage requests information stored in the Fileforce storage 898. The Fileforce storage 898 may store information such as documents, images, and basic large objects (BLOBs). By managing requests for information using the Fileforce servers 886, the image footprint on the database may be reduced.

The query servers 882 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some implementations, the ACS servers 880 may control access to data, hardware resources, or software resources.

In some implementations, the batch servers 884 may process batch jobs, which are used to run tasks at specified times. Thus, the batch servers 884 may transmit instructions to other servers, such as the app servers 888, to trigger the batch jobs. For some implementations, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some implementations, one or more query servers 882 may communicate with the NFS 896 to retrieve and/or update information stored outside of the pod 844. The NFS 896 may allow servers located in the pod 844 to access information to access files over a network in a manner similar to how local storage is accessed. In some implementations, queries from the query servers 882 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some implementations, the pod may include one or more database instances 890. The database instance 890 may transmit information to the QFS 892. When information is transmitted to the QFS, it may be available for use by servers within the pod 844 without requiring an additional database call. In some implementations, database information may be transmitted to the indexer 894. Indexer 894 may provide an index of information available in the database 890 and/or QFS 892. The index information may be provided to Fileforce servers 886 and/or the QFS 892.

Figure 9:
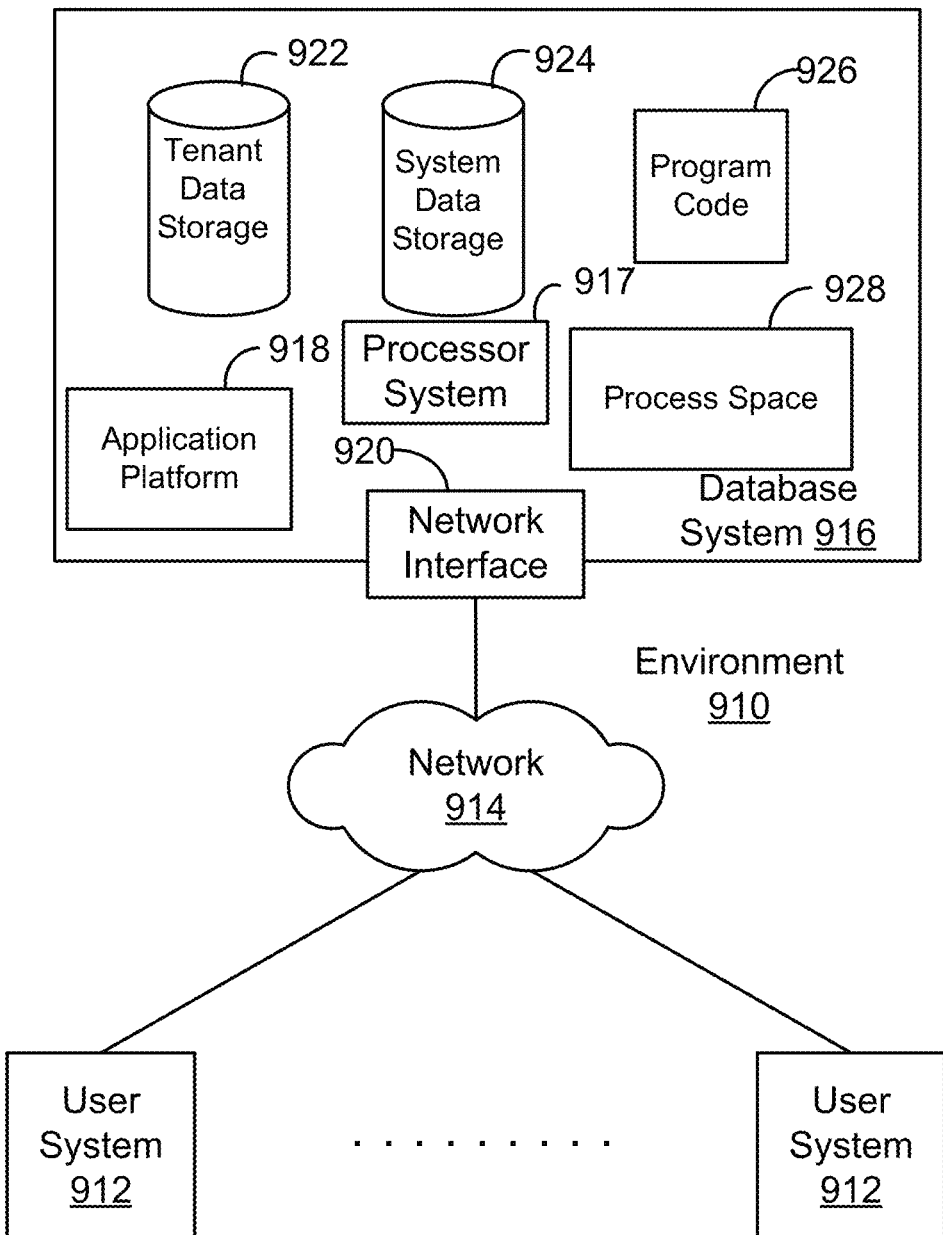
FIG. 9 shows a system diagram illustrating the architecture of a multi-tenant database environment, in accordance with some implementations.
Figure 10:
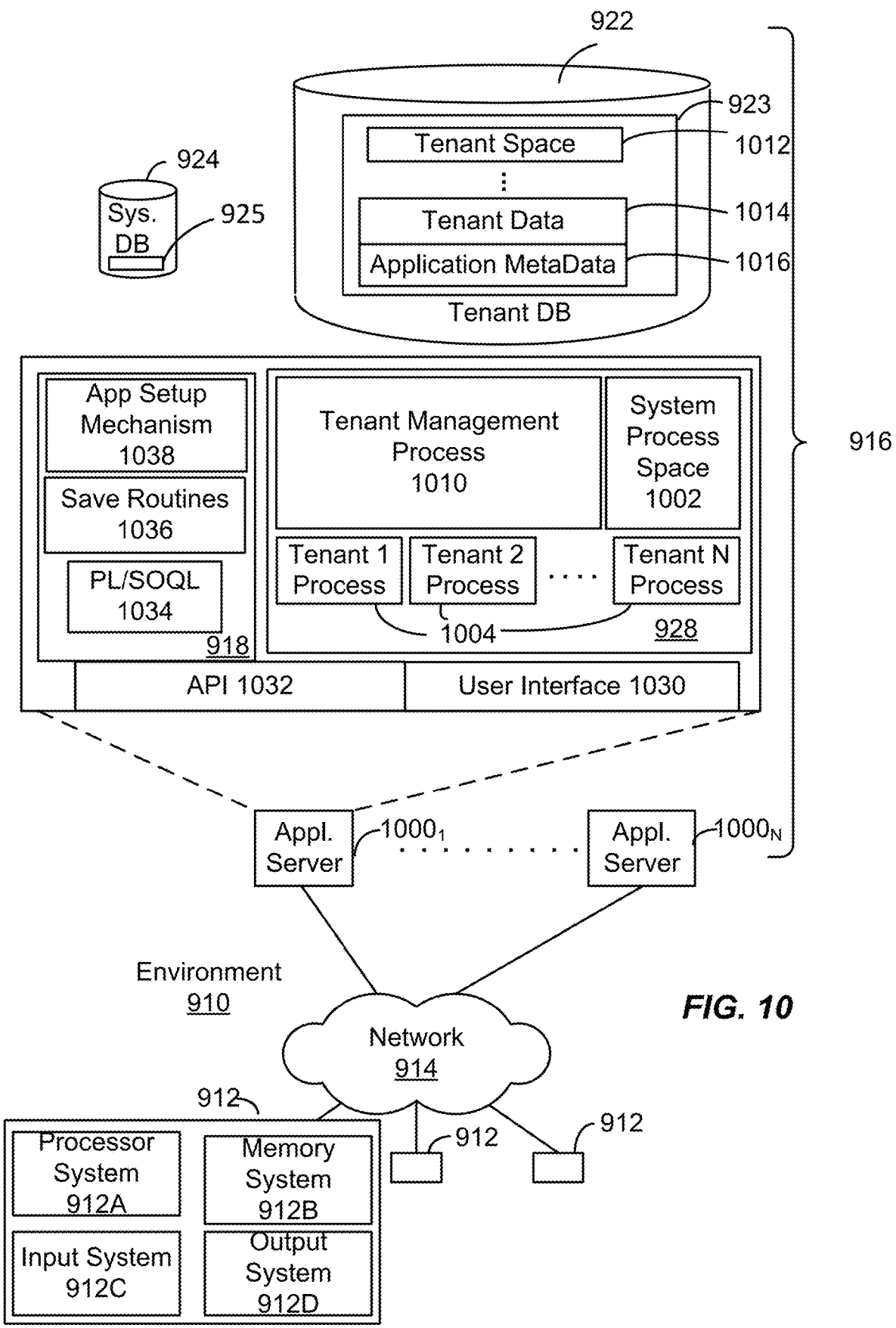
FIG. 10 shows a system diagram further illustrating the architecture of a multi-tenant database environment, in accordance with some implementations.

FIG. 9 shows a block diagram of an environment 910 wherein an on-demand database service might be used, in accordance with some implementations. Environment 910 includes an on-demand database service 916. User system 912 may be any machine or system that is used by a user to access a database user system. For example, any of user systems 912 can be a handheld computing system, a mobile phone, a laptop computer, a workstation, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some implementations are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some implementations, system 916, shown in FIG. 9, implements a web-based customer relationship management (CRM) system. For example, in some implementations, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain implementations, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, implementations are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some implementations, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the implementations described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for carrying out disclosed operations can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some implementations, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some implementations. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other implementations, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain implementations, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some implementations, therefore, an interface system implementing a load balancing function (e.g., an F5 Big-IP load balancer) is communicably coupled between the application servers 1000 and the user systems 912 to distribute requests to the application servers 1000. In some implementations, the load balancer uses a least connections algorithm to route user requests to the application servers 1000. Other examples of load balancing algorithms, such as round robin and observed response time, also can be used. For example, in certain implementations, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain implementations, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. In some implementations, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein but should be defined only in accordance with the following and later-submitted claims and their equivalents.

What is claimed is:

1. A computer program product for developing mobile applications comprising computer-readable program code to be executed by a processor of a mobile operating system (OS) based device when retrieved from a non-transitory computer-readable medium, the program code including instructions configurable to cause:

determining a set of available products;

identifying a set of navigation patterns corresponding to the set of available products;

providing a user interface with one or more options for selecting and configuring features of a mobile application, the features of the mobile application including a set of product display features determined according to the set of available products, a set of global navigation features determined according to the set of navigation patterns, and a set of product navigation features;

obtaining, via the user interface, selected and configured features of the mobile application, the selected and configured features including at least: a subset of the product display features, a subset of the global navigation features, and a subset of the product navigation features;

generating metadata corresponding to the selected and configured features of the mobile application, including at least: metadata characterizing the subset of product display features, metadata characterizing the subset of global navigation features, and metadata characterizing the subset of product navigation features;

generating code associated with the mobile application based on the metadata corresponding to the selected and configured features of the mobile application, the code executable by a processor of a mobile operating system (OS) based device; and associating the code with a unique mobile application global identifier relative to an app store.

2. The computer program product of claim 1, wherein the user interface is configured as a declarative user interface.

3. The computer program product of claim 1, wherein a product display feature is associated with a layout feature, and wherein a product navigation feature is configured to enable navigating a set of one or more products to be displayed by the mobile application.

4. The computer program product of claim 1, wherein a global navigation feature is configured to enable navigating from a homepage of the mobile application.

5. The computer program product of claim 4, wherein the navigating from the homepage of the mobile application is to be performed using a card user interface.

6. The computer program product of claim 1, the instructions further configurable to cause:
associating the code with a global configuration; and
enabling the global configuration to be updated to generate a customized configuration for the mobile application.

7. The computer program product of claim 6, wherein the global configuration is stored in a mobile device associated with the mobile application.

8. A system for developing mobile applications comprising:
one or more processors; and
a non-transitory computer readable medium storing a plurality of instructions, which when executed, cause the one or more processors to:
determine a set of available products;
identify a set of navigation patterns corresponding to the set of available products;
provide a user interface with one or more options for selecting and configuring features of a mobile application, the features of the mobile application including a set of product display features determined according to the set of available products, a set of global navigation features determined according to the set of navigation patterns, and a set of product navigation features;
obtain, via the user interface, selected and configured features of the mobile application, the selected and configured features including at least: a subset of the product display features, a subset of the global navigation features, and a subset of the product navigation features;
generate metadata corresponding to the selected and configured features of the mobile application, including at least: metadata characterizing the subset of product display features, metadata characterizing the subset of global navigation features, and metadata characterizing the subset of product navigation features;
generate code associated with the mobile application based on the metadata corresponding to the selected and configured features of the mobile application, the code executable by a processor of a mobile operating system (OS) based device; and
associate the code with a unique mobile application global identifier relative to an app store.

9. The system of claim 8, wherein the user interface is configured as a declarative user interface.

10. The system of claim 8, wherein a product display feature is associated with a layout feature, and wherein a product navigation feature is configured to enable navigating a set of one or more products to be displayed by the mobile application.

11. The system of claim 8, wherein a global navigation feature is configured to enable navigating from a homepage of the mobile application.

12. The system of claim 11, wherein the navigating from the homepage of the mobile application is to be performed using a card user interface.

13. The system of claim 8, wherein the instructions, which when executed, further cause the one or more processors to:
associate the code with a global configuration; and
enable the global configuration to be updated to generate a customized configuration for the mobile application.

14. The system of claim 13, wherein the global configuration is stored in a mobile device associated with the mobile application.

15. A computer implemented method for developing mobile applications, the method comprising:
determining a set of available products;
identifying a set of navigation patterns corresponding to the set of available products;
providing a user interface with one or more options for selecting and configuring features of a mobile application, the features of the mobile application including a set of product display features determined according to the set of available products, a set of global navigation features determined according to the set of navigation patterns, and a set of product navigation features;
obtaining, via the user interface, selected and configured features of the mobile application, the selected and configured features including at least: a subset of the product display features, a subset of the global navigation features, and a subset of the product navigation features;
generating metadata corresponding to the selected and configured features of the mobile application, including at least: metadata characterizing the subset of product display features, metadata characterizing the subset of global navigation features, and metadata characterizing the subset of product navigation features;
generating code associated with the mobile application based on the metadata corresponding to the selected and configured features of the mobile application, the code executable by a processor of a mobile operating system (OS) based device; and
associating the code with a unique mobile application global identifier relative to an app store.

16. The method of claim 15, wherein the user interface is configured as a declarative user interface.

17. The method of claim 15, wherein a product display feature is associated with a layout feature, and wherein a product navigation feature is configured to enable navigating a set of one or more products to be displayed by the mobile application.

18. The method of claim 15, wherein a global navigation feature is configured to enable navigating from a homepage of the mobile application.

19. The method of claim 18, wherein the navigating from the homepage of the mobile application is configured based on a card user interface.

20. The method of claim 15, further comprising:
associating the code with a global configuration; and
enabling the global configuration to be updated to generate a customized configuration for the mobile application.

* * * * *